(12) United States Patent
Shang et al.

(10) Patent No.: US 11,118,681 B2
(45) Date of Patent: Sep. 14, 2021

(54) PISTON-TYPE POSITIVE DISPLACEMENT MACHINE WITH A PRESSURE-ADAPTIVE PISTON-CYLINDER INTERFACE

(71) Applicant: Purdue Research Foundation, West Lafayette, IN (US)

(72) Inventors: Lizhi Shang, West Lafayette, IN (US); Shanmukh Sarode, West Lafayette, IN (US); Andrea Vacca, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/857,099

(22) Filed: Apr. 23, 2020

(65) Prior Publication Data
US 2020/0340581 A1    Oct. 29, 2020

Related U.S. Application Data

(60) Provisional application No. 62/837,883, filed on Apr. 24, 2019.

(51) Int. Cl.
*F16J 1/02*     (2006.01)
*F04B 27/04*    (2006.01)
*F04B 27/08*    (2006.01)

(52) U.S. Cl.
CPC ............. *F16J 1/02* (2013.01); *F04B 27/0409* (2013.01); *F04B 27/0865* (2013.01)

(58) Field of Classification Search
CPC ....... F16J 1/02; F16J 1/08; F16J 10/04; F01B 3/0014; F01B 3/0044; F04B 1/122; F04B 39/0292
See application file for complete search history.

(56) References Cited

U.S. PATENT DOCUMENTS

| | | | | | |
|---|---|---|---|---|---|
| 3,153,987 | A | * | 10/1964 | Hans ..................... | F01B 3/0085 92/57 |
| 3,292,553 | A | * | 12/1966 | Hann ..................... | F01B 3/0052 91/486 |
| 3,783,744 | A | * | 1/1974 | Benkovic ................ | F04B 1/126 92/57 |

(Continued)

OTHER PUBLICATIONS

Busquets, An Investigation of Micro-Surface Shaping on the Piston/Cylinder Interface of Axial Piston Machines, Ph.D. Dissertation, Purdue University, 2018.

(Continued)

*Primary Examiner* — Thomas E Lazo
(74) *Attorney, Agent, or Firm* — Piroozi-IP, LLC

(57) ABSTRACT

A piston and cylinder assembly of an axial piston machine is disclosed which includes a cylinder having a uniform internal diameter, a cylindrical bushing press-fit against the inner surface of the cylinder and extending at least partially therein, the bushing comprising at least one circumferential groove formed on an outer surface of the bushing against the inner surface of the cylinder, a piston reciprocably disposed within the cylindrical bushing, generating a piston-bushing-interface, the piston and the bushing defining a diametrical clearance therebetween, the diametrical clearance defining a lubrication gap and a fluid-dynamic seal between the piston and the cylindrical bushing.

19 Claims, 23 Drawing Sheets

(56) References Cited

U.S. PATENT DOCUMENTS

| | | | | |
|---|---|---|---|---|
| 4,437,389 | A * | 3/1984 | Kline | F01B 3/0032 91/499 |
| 5,085,127 | A * | 2/1992 | Gantzer | F01B 3/0032 417/269 |
| 5,971,717 | A * | 10/1999 | Berthold | F01B 3/0052 417/269 |
| 7,073,427 | B2 * | 7/2006 | Donders | F01B 3/0044 91/46 |
| 8,104,398 | B2 * | 1/2012 | Bergmann | F04B 1/2078 92/158 |
| 9,518,573 | B2 * | 12/2016 | Kim | F04B 35/045 |
| 10,247,177 | B2 * | 4/2019 | Ivantysynova | F04B 39/0292 |
| 2005/0147507 | A1 * | 7/2005 | Makino | F01B 3/0088 417/375 |
| 2012/0079936 | A1 | 4/2012 | Ivantysynova et al. | |
| 2017/0016431 | A1 * | 1/2017 | Ivantysynova | F01B 3/0044 |

OTHER PUBLICATIONS

Dowd et al., Tribological Interaction between Piston and Cylinder of a Model High Pressure Hydraulic Pump, A S L E Transactions, 18:1, 21-30, 1975.

Yamaguchi, Motion of Pistons in Piston-Type Hydraulic Machines, First Report, Bulletin of JSME, vol. 19, No. 130, pp. 402-419, 1976.

Yamaguchi, Motion of Pistons in Piston-Type Hydraulic Machines, Second Report, Bulletin of JSME, vol. 19, No. 130, pp. 402-419, 1976.

Pelosi et al., A Novel Fluid-Structure Interaction Model for Lubricating Gaps of Piston Machines, Proc. of the 5th Fluid Structure Interaction Conference, Crete, pp. 13-24, 2009.

Wondergem et al., The Impact of the Surface Shape of the Piston on Power Losses, FPNI2014 7843, 8th FPNI Ph.D Symposium on Fluid Power, FPNI, Lappeenranta, Finland, pp. 1-12, 2014.

Ernst et al., Cylinder Bore Micro-Surface Shaping for High Pressure Axial Piston Machine Operation Using Water as Hydraulic Fluid, ASME. Fluid Power Systems Technology, ASME/BATH 2017 Symposium on Fluid Power and Motion Control, 2017.

Shang et al., A temperature adaptive piston design for swash plate type axial piston machines, International Journal of Fluid Power, 18:1, 38-48, 2017.

Ivantysynova, M. and Huang, Ch., Investigation of the gap flow in displacement machines considering the elastohydrodynamic effect, 5th JFPS International Symposium on Fluid Power. Nara, Japan, pp. 219-229, 2002.

Lasaar, Eine Untersuchung zur mikro- und makrogeometrischen Gestaltung der Kolben/ Zylinderbaugruppe von Schrägscheibenmaschinen.VDI Fortschrittsberichte Reihe 1 No. 364, VDI Verlag Düsseldorf, Germany, 2003.

Lasaar, Eine Untersuchung zur mikro- und makrogeometrischen Gestaltung der Kolben/ Zylinderbaugruppe von Schrägscheibenmaschinen.VDI Fortschrittsberichte Reihe 1 No. 364, VDI Verlag Düsseldorf, Germany, 2003 (Translation of Abstract).

Wieczorek et al., Computer Aided Optimization of Bearing and Sealing Gaps in Hydrostatic Machines—The Simulation Tool CASPAR. International Journal of Fluid Power, vol. 3 (2002), No. 1, pp. 7-20, 2002.

Chacon et al., Advanced Virtual Prototyping of Axial Piston Machines, ASME. Fluid Power Systems Technology, 9th FPNI Ph.D. Symposium on Fluid Power, 2016.

Pelosi, An Investigation on the Fluid-Structure Interaction of Piston/ Cylinder Interface, PhD Dissertation, Purdue University, 2012.

* cited by examiner

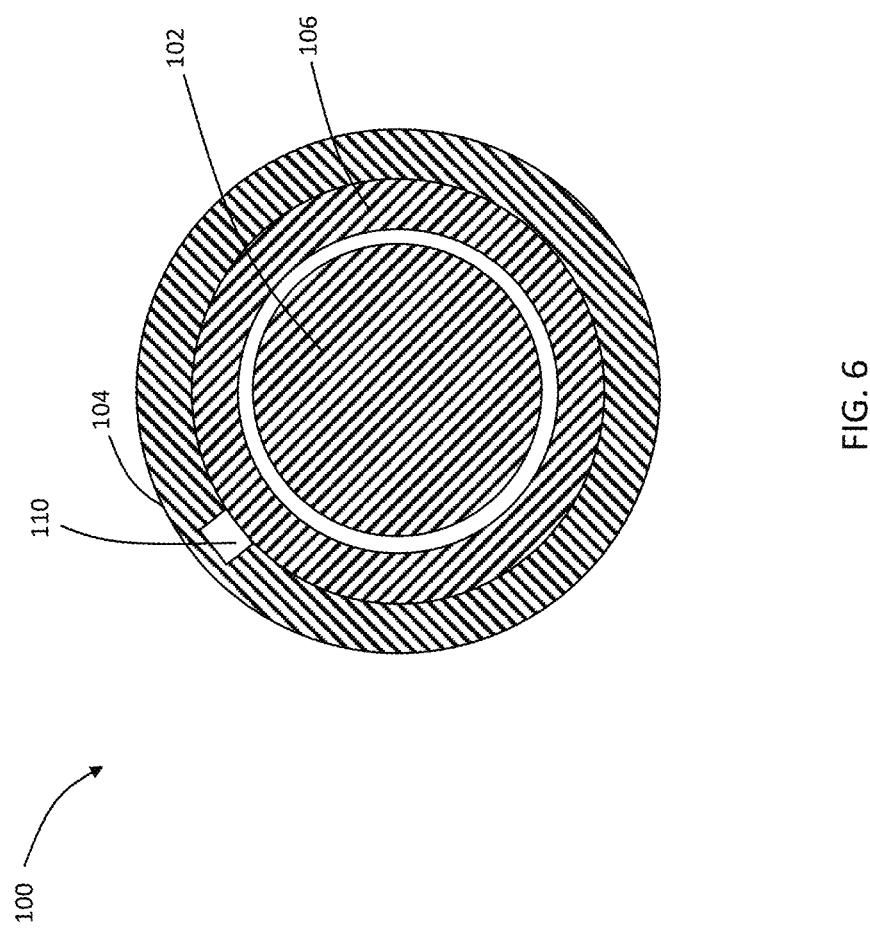

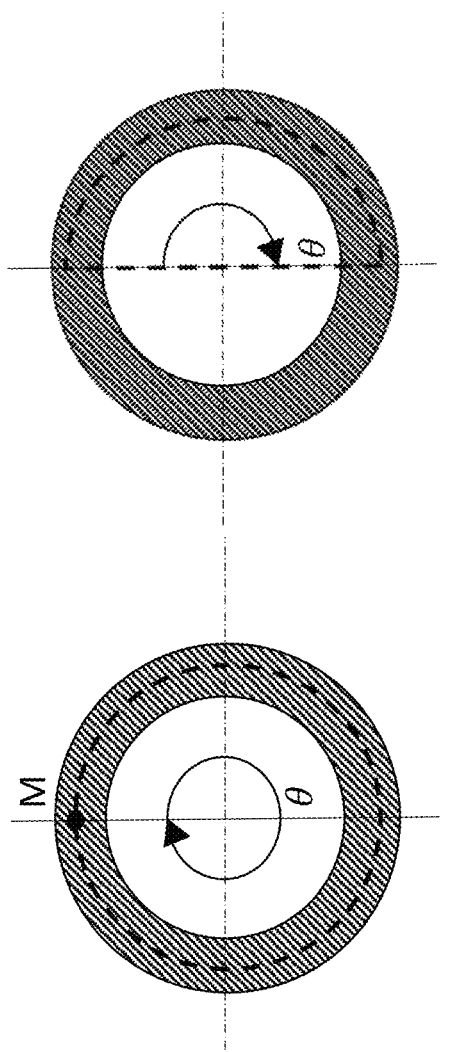
θ = 180°
FIG. 23
θ = 360°
FIG. 22
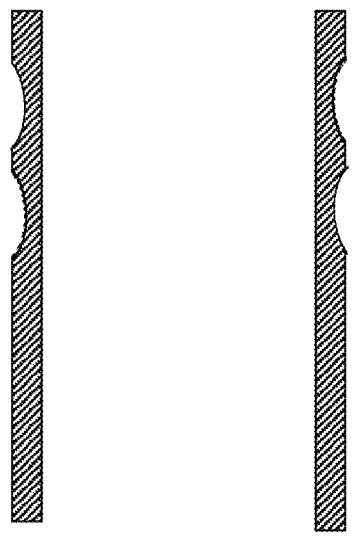
FIG. 21

PISTON-TYPE POSITIVE DISPLACEMENT MACHINE WITH A PRESSURE-ADAPTIVE PISTON-CYLINDER INTERFACE

CROSS-REFERENCE TO RELATED APPLICATIONS

The present patent application is related to and claims the priority benefit of U.S. Provisional Patent Application Ser. No. 62/837,883 filed Apr. 24, 2019, the contents of which is hereby incorporated by reference in its entirety into the present disclosure.

STATEMENT REGARDING GOVERNMENT FUNDING

The present disclosure was not made with government support.

TECHNICAL FIELD

The present disclosure generally relates to axial piston machines, and in particular, to an axial piston machine with pressure adaptive piston pump.

BACKGROUND

This section introduces aspects that may help facilitate a better understanding of the disclosure. Accordingly, these statements are to be read in this light and are not to be understood as admissions about what is or is not prior art.

Axial piston machines are widely used in different applications such as heavy machinery, agriculture and, aerospace, owing to their ability to operate at high pressure and versatile control. One type of such axial piston machine is a swashplate type in which a plurality of pistons are coupled to a swashplate positioned at an angle to pistons, such that when the swashplate rotates, pistons reciprocate within corresponding cylinders providing pumping actions.

Referring to FIG. 1, an exemplary prior art swashplate type axial piston machine 1 is shown. This axial piston machine includes 9 pistons 2 with a swashplate 3 at a given inclination indicated by the angle β. The delivery of fluid can be varied by adjusting the inclination of the swashplate.

The operational efficiency of these axial piston machines of the swashplate type is characterized by three main lubricating interfaces namely, the piston-cylinder interface, the cylinder block/valve plate interface and, the slipper/swashplate interface. The interfaces are challenging to design due to the difficulty of achieving the sealing as well as the load bearing functions simultaneously. Unlike the other two interfaces, the side load acting on the piston due to the reaction from the swashplate has to be fluid-dynamically balanced by the pressure inside the gap between the piston and the cylinder bore. In other words, creating a tight seal in the piston-cylinder interface to prevent leakage is competing against excessive losses experienced due to frictional forces. Among the three lubricating interfaces, the piston-cylinder interface has the highest contribution to the net energy dissipation from the machine. Therefore, a significant amount of work has been performed to both model and improve the performance of the piston-cylinder interfaces.

Clearance, surface finish, and the materials are some of the critical factors in the performance of the piston-cylinder interface. In addition shape of the piston has also been a source of investigation. For example, others have investigated micro-surface shaping on the cylinder bore. Yet other proposed a novel bi-material piston design that utilized the thermal deformation to change the clearance between the piston and the cylinder bore to adapt to different operating temperatures.

However, additional improvement is needed to improve the energy efficiency while not requiring expensive manufacture process of micro surface shaping on the running surface. In doing so, reducing leakage without increasing the viscous dissipation so as to reduce the net energy dissipation is also an unmet goal.

Therefore, there is an unmet need for a novel approach to improve the piston-cylinder interface in an axial piston machine.

SUMMARY

A piston and cylinder assembly of an axial piston machine is disclosed. The assembly includes a cylinder having a uniform internal diameter. The assembly further includes a cylindrical bushing press-fit against the inner surface of the cylinder and extending at least partially therein, the bushing comprising at least one circumferential groove formed on an outer surface of the bushing against the inner surface of the cylinder. Furthermore, the assembly includes a piston reciprocably disposed within the cylindrical bushing, generating a piston-bushing-interface, the piston and the bushing defining a diametrical clearance therebetween, the diametrical clearance defining a lubrication gap and a fluid-dynamic seal between the piston and the cylindrical bushing, creating fluid-dynamic buildup of pressure therebetween. The reciprocating action of the piston defines a cyclic motion including 1) a negative pressure phase wherein the piston is retracted from base of the cylinder thereby drawing in fluid from outside of the cylinder into the cylinder, and 2) a high-pressure phase in which the piston is pushed towards the base of the cylinder with fluid therein. The assembly also includes a fluid channel between the at least one circumferential groove of the cylindrical bushing and high pressure source.

A piston and cylinder assembly of a piston-type positive displacement machine is also disclosed. The assembly includes a cylinder having a uniform internal diameter, the cylinder comprising at least one circumferential cavity formed therein. The assembly also includes a piston reciprocably disposed within the cylinder, generating a piston-cylinder interface, the piston and the cylinder defining a diametrical clearance therebetween, the diametrical clearance defining a lubrication gap and a fluid-dynamic seal between the piston and the cylinder, creating fluid-dynamic buildup of pressure therebetween. The reciprocating action of the piston defines a cyclic motion including 1) a negative pressure phase wherein the piston is retracted from base of the cylinder thereby drawing in fluid from outside of the cylinder into the cylinder, and 2) a high-pressure phase in which the piston is pushed towards the base of the cylinder with fluid therein. The assembly also includes a fluid channel between the at least one circumferential cavity of the cylinder and a high pressure source.

BRIEF DESCRIPTION OF DRAWINGS

FIG. 6 is a section A-A' cut away to further show the piston-bushing-cylinder interface of FIG. 5.

FIG. 21 is a cross section of a bushing according to one embodiment, where there are two grooves shown in the bushing.

FIGS. 22 and 23 are end views of bushings according to various embodiments, one bushing is shown with a groove covering the entire circumference (FIG. 22), and one bushing is shown where the groove covers only 50% of the circumference (FIG. 23).

DETAILED DESCRIPTION

Figure 1:
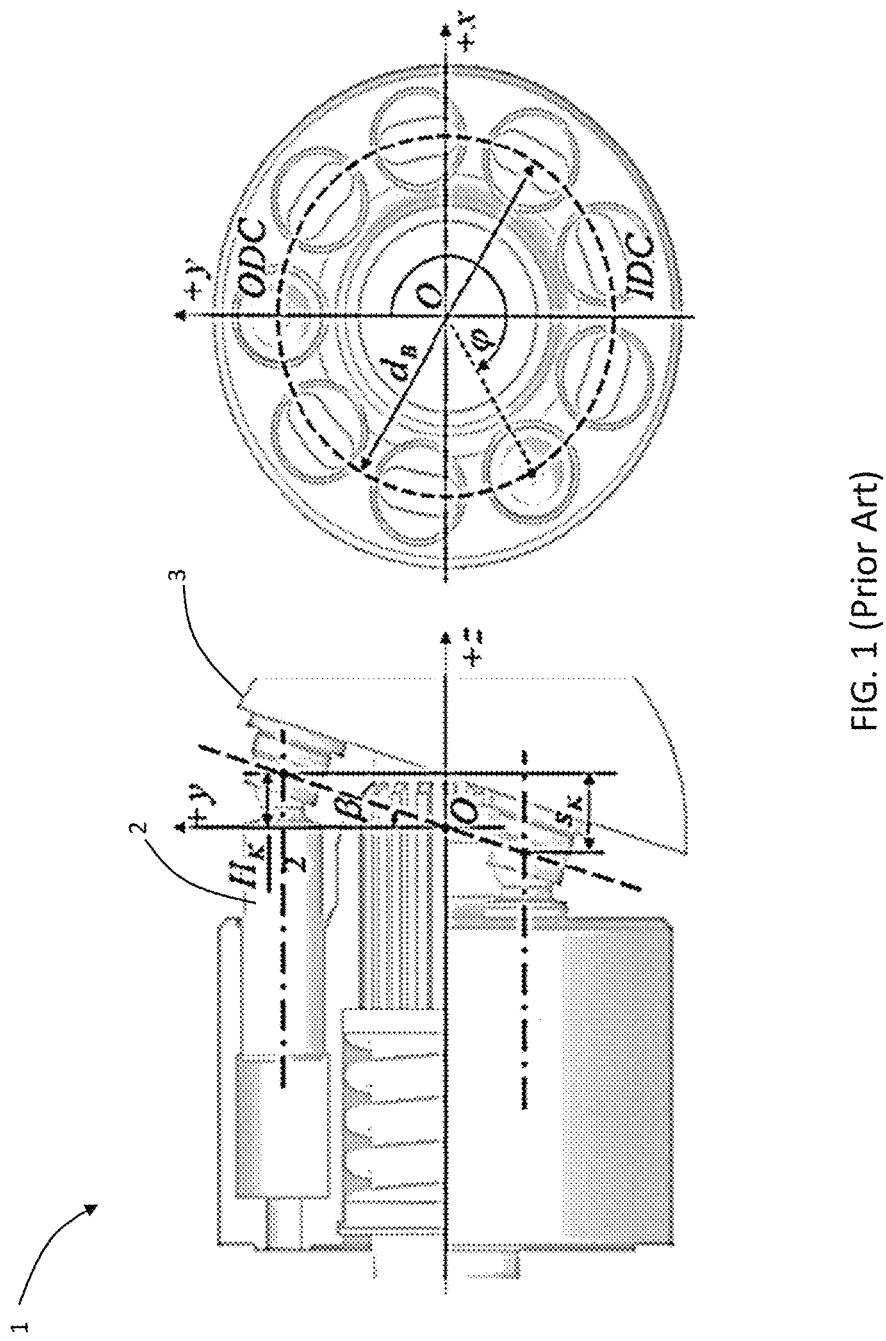
FIG. 1 is a schematic of an exemplary prior art swashplate type axial piston machine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is provided in the present disclosure to improve the piston-cylinder interface in an axial piston machine. This novel approach includes placement of bushing between the piston and the cylinder wall with the bushing having a circumferential groove therein in communication with a high-side pressure of the piston-cylinder interface. The groove allows selective deflection governed by design and pressures to provide an optimal piston-cylinder sealing interface.

While the description provided below is mainly concerned with swash plate axial piston machines, it should be appreciated that the present disclosure can be equally applied to any positive displacement machines with a pressure-adaptive piston-cylinder interface. For example, radial piston machines and in-line piston machines are examples of such positive displacement machines that are also within the ambit of the present disclosure. In particular, within the category of axial piston machines are also bent axis type axial piston machines that are also with the ambit of the present disclosure. To this end, the present disclosure provides a detailed example of a swash plate axial piston machine and the associated pressure-adaptive piston-cylinder interface, however, as explained the same description is equally applicable to other positive displacement machines.

Figure 2:
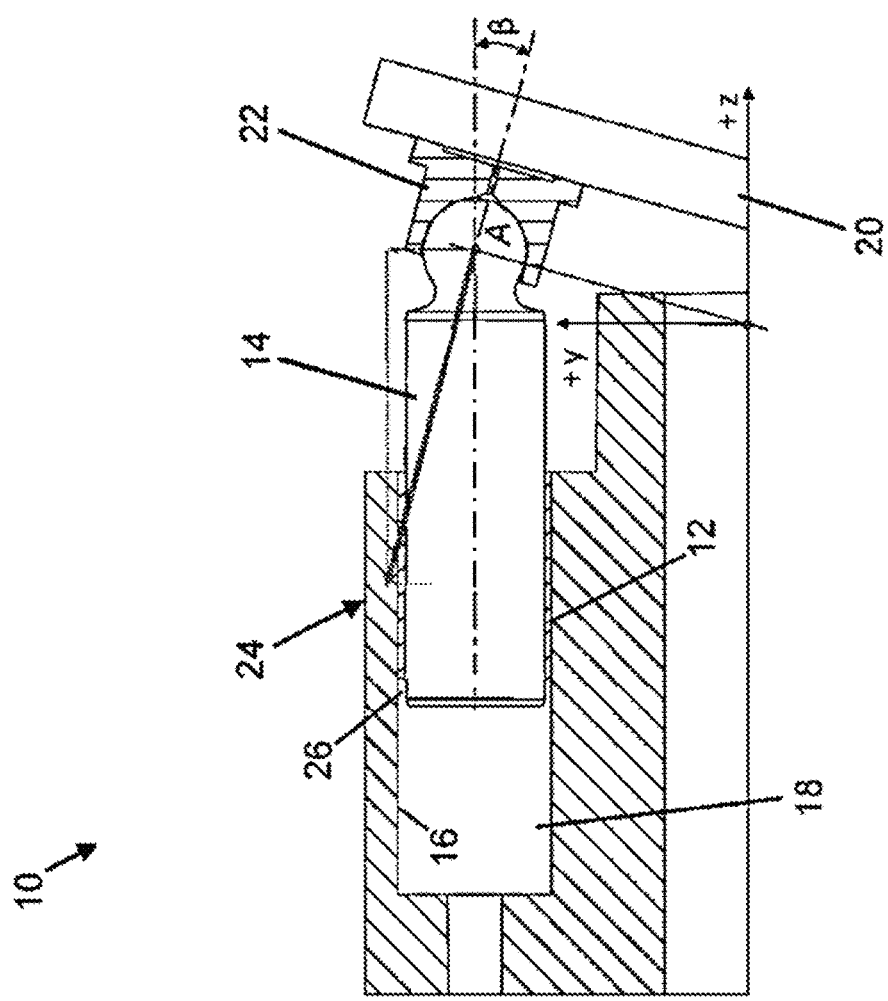
FIG. 2 is a schematic of a typical axial piston machine.

To this end, in order to develop a better understanding of the arrangement of the present disclosure, reference is made to FIG. 2, which is a schematic of a typical axial piston machine 10 without the aforementioned bushing. FIG. 2 is drawn merely for purposes of clarity when viewed in combination with the following description. In addition to the basic components of the machine 10, FIG. 2 represents the dynamics of a fluid film 12 between a piston 14 and a cylinder 16 of the piston and cylinder assembly and forces acting on the piston 14 as it reciprocates within the cylinder 16. The axes of the piston 14 and cylinder 16 generally coincide, and the bearing surfaces of the pisto 14 and cylinder 16 are cylindrical and of uniform diameter, consistent with standard industry practices. In addition to its bearing surface, the piston 14 has a protruding end configured to achieve a ball-and-socket arrangement with a socket formed on a slipper 22, which has a planar surface that bears against a swashplate 20. Discussion of various forces in relationship with the piston 14 and the cylinder 16 is provided below.

As understood in the art, a cylinder block 24 contains a number of piston and cylinder assembles (not shown) similar to the one shown, and these assemblies are typically in a circular array that is coaxial with the rotational axis (the +z axis in FIG. 2) of the block 24. The motion induced in the piston 14 by the rotation of the block 24 is referred to herein as the macro motion of the piston 14. The piston 14 also undergoes what will be termed as micro motion due to the changing forces, resulting in the pisto 14 pitching within the cylinder 16. The inclination of the pisto 14 relative to the cylinder 16 is due primarily to the y-component of the swashplate 20 and the associated forces, which causes the gap 26 formed by the diametrical clearance between the piston 14 and cylinde 16 to have a nonuniform and varying gap height in both the axial and circumferential directions. The gap height between the piston 14 and cylinder 16 is a function of angle of rotation of the machine.

The gap 26 between the piston 14 and cylinder 16 is very small, typically on the order of 0.5% or less of the diameter of the cylinder 16 and on the order of about 0.04 mm or less for a typical axial piston machine designs. The gap 26 allows fluid flow from the displacement chamber 18 to the exterior of the cylinder block 24. Pressure builds up in the gap 26 because the cylindrical bearing surfaces of the piston 14 and cylinder 16 are moving relative to each other, the bearing surfaces are not parallel to each other, and the fluid is viscous. This pressure field performs two important functions: it provides the reaction force necessary to support the piston 14 so that mixed friction is avoided, and it helps seal the gap 26 so that leakage from the displacement chamber 18 is minimized.

Figure 3:
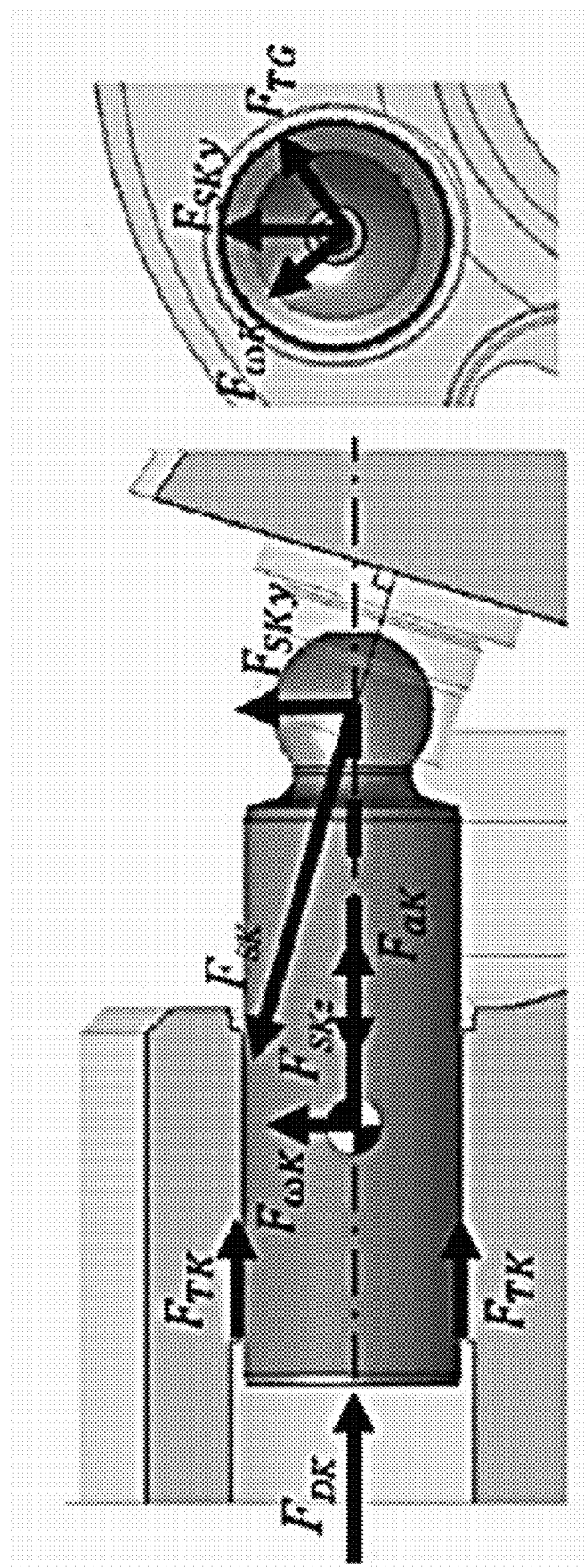
FIG. 3 is a free-body diagram of a piston cylinder in an axial piston machine where specific forces acting on the piston-cylinder interface are shown.

With that preliminary explanation of a typical axial piston machine, reference is now made to FIG. 3 which is a free-body diagram where specific forces acting on the piston-cylinder interface are described. A global coordinate system has been considered (shown as +x, +y, +z in FIGS. 1 and 2) with the origin located at the point where an axis at the center of a shaft centrally positioned about the swashplate (see the swashplate 3, for example in FIG. 1) wherein shaft axis intersects a virtual plane connecting all piston ball centers. As shown in FIG. 1, the positive y-axis is along the outer dead center (ODC), the positive z-axis pointing towards the swash plate along the shaft axis and, the positive x-axis can be deduced from the right hand rule. The maximum stroke of each piston ($H_K$) inside the cylinder of the block depends on the inclination of the swashplate 3 ($\beta$) as well as the pitch radius of the block (RB). The relationship between $H_K$ and $R_B$ is shown below in (1).

$$H_K = 2R_B \tan \beta \quad (1)$$

The piston location in general also varies with the angular position of the piston ($\varphi$) as indicated from the relationship below in (2).

$$s_K = -R_b \tan \beta (1 - \cos \varphi) \quad (2)$$

Assuming the shaft angular speed as cow, the piston sliding velocity and acceleration can be derived as provided below by (3) and (4).

$$v_k = \frac{ds_K}{d\varphi}\omega = -\frac{1}{2}\omega H_K \sin\varphi \quad (3)$$

$$a_k = \frac{dv_K}{d\varphi}\omega = -\frac{1}{2}\omega^2 H_K \cos\varphi \quad (4)$$

The physical forces acting within the piston-cylinder interface are represented in the above FIG. 3. Usually, the largest force acting on the piston is the force due to the pressure in the displacement chamber, $F_{DK}$, as defined below in (5).

$$F_{DK} = \pi R_K^2 (p_{DC} - p_{case}) \quad (5)$$

The other major external force acting on the piston is the axial inertia force due to the acceleration of the piston $F_{aK}$ as provided in (6) below.

$$K_{aK} = -m_K a_K = m_K \omega^2 R_b \tan \beta \cos \varphi \quad (6)$$

The viscous friction forces over one shaft revolution due to the viscosity of the fluid can be evaluated by integrating the shear stresses over the piston surface area as provided in (7) below.

$$F_{TK\hat{x}}(\varphi) = \oint \mu \frac{\partial \hat{u}}{\partial \hat{z}}\bigg|_{\hat{z}=h} dA \quad (7)$$

$$F_{TK\hat{y}}(\varphi) = \oint \mu \frac{\partial \hat{v}}{\partial \hat{z}}\bigg|_{\hat{z}=h} dA$$

All these external forces act along the z-axis and are be balanced by a net reaction force ($F_{SK}$) from the swashplate, as provided in (8) below.

$$F_{SK} = -\frac{F_{aK} + F_{TK} + F_{DK}}{\cos \beta} \quad (8)$$

The component of this force in the y-direction given by $F_{SKy}$ which has to be balanced by the pressure developed in the gap as provided by (9) below.

$$F_{SKy} = (F_{aK} + F_{TK} + F_{DK}) \tan \beta \quad (9)$$

The centrifugal force due to rotation of the piston and slipper around the shaft is given by (10), provided below.

$$F_{\omega K} = (m_K + m_G)\omega^2 R_b \quad (10)$$

In addition, there is a force acting on the piston as result of the viscous friction between the slipper and the swashplate, as provided in (11), below.

$$F_{TG} = \mu \frac{\omega R_b}{h_G}\left[\frac{\pi}{4}(d_{Gout}^2 - d_{Gin}^2)\right] \quad (11)$$

Figure 4:
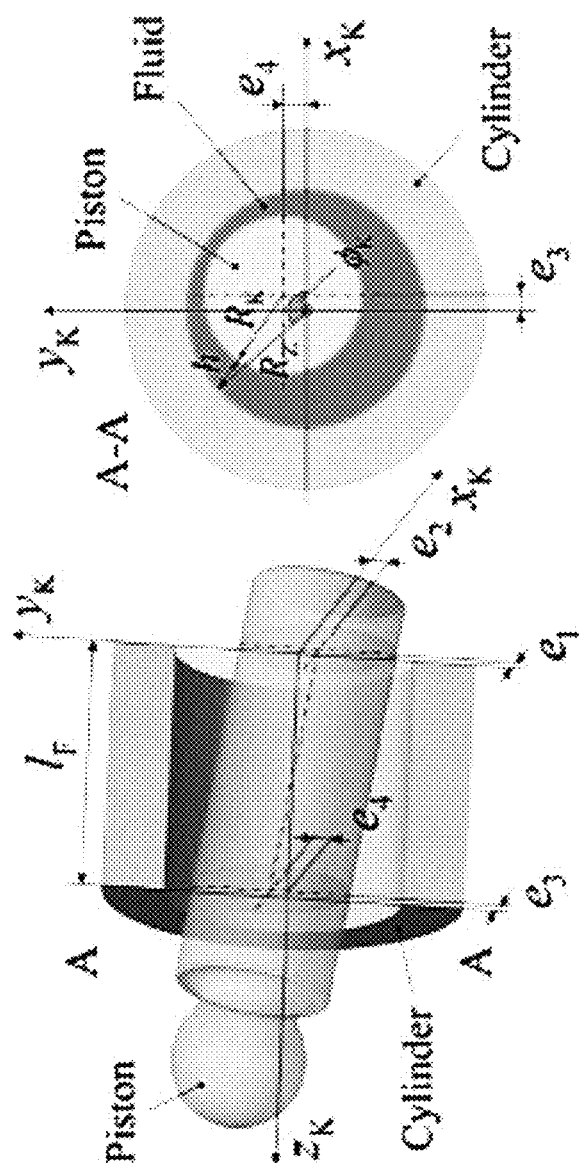
FIG. 4 is a schematic showing instantaneous eccentric piston position inside a bore.

For the scope of the present disclosure, the piston-cylinder interface is reviewed separately and therefore, a constant fluid film thickness below the slipper ($h_G$) is assumed. All these radial external forces must be balanced by a fluid-dynamic pressure in the lubricating interface to prevent metal to metal contact. The dynamic fluid film geometry also directly affects the solid body deformations due to pressure and temperature as well as the squeeze motion of the piston during operation. Therefore, it is important to accurately define and calculate the fluid film geometry. The fluid film is defined by the eccentric position of the piston within the cylinder bore as demonstrated in FIG. 4, which is a schematic showing instantaneous eccentric piston position inside a bore as developed by Pelosi in 2012. The eccentricity of the piston with respect to the coordinate system of the piston as defined in FIG. 4 can be written as (12) and (13) provided below.

$$x_m(z_K) = \frac{e_3 - e_1}{l_f} z_K + e_1 \quad (12)$$

$$y_m(z_K) = \frac{e_4 - e_2}{l_f} z_K + e_2 \quad (13)$$

The dynamic fluid film thickness of the inclined piston within the cylinder at any instant is given by (14), provided below.

$$h(z_K, \varphi_K) = \sqrt{(R_z \cos\varphi_K - x_m(z_K))^2 + (R_z \sin\varphi_K - y_m(z_K))^2} - R_K + \Delta h \quad (14)$$

where solid body deformations due to pressure and temperature which are an important aspect in the presented research are accounted in the $\Delta h$ term.

With the theoretical forces discussed above, reference is now made to the novel arrangement of the present disclosure. A change in the fluid film geometry directly affects the bearing and the sealing function of the interface and therefore, the overall energy dissipation. A novel piston-cylinder interface design with a circumferential pressure adaptive groove is hereby disclosed. Such a design is able to reduce the energy dissipation by improving the sealing function of the interface. Moreover, such a design is also cost effective and does not require any micron level manufacturing as compared to other relevant research in this aspect.

Figure 5:
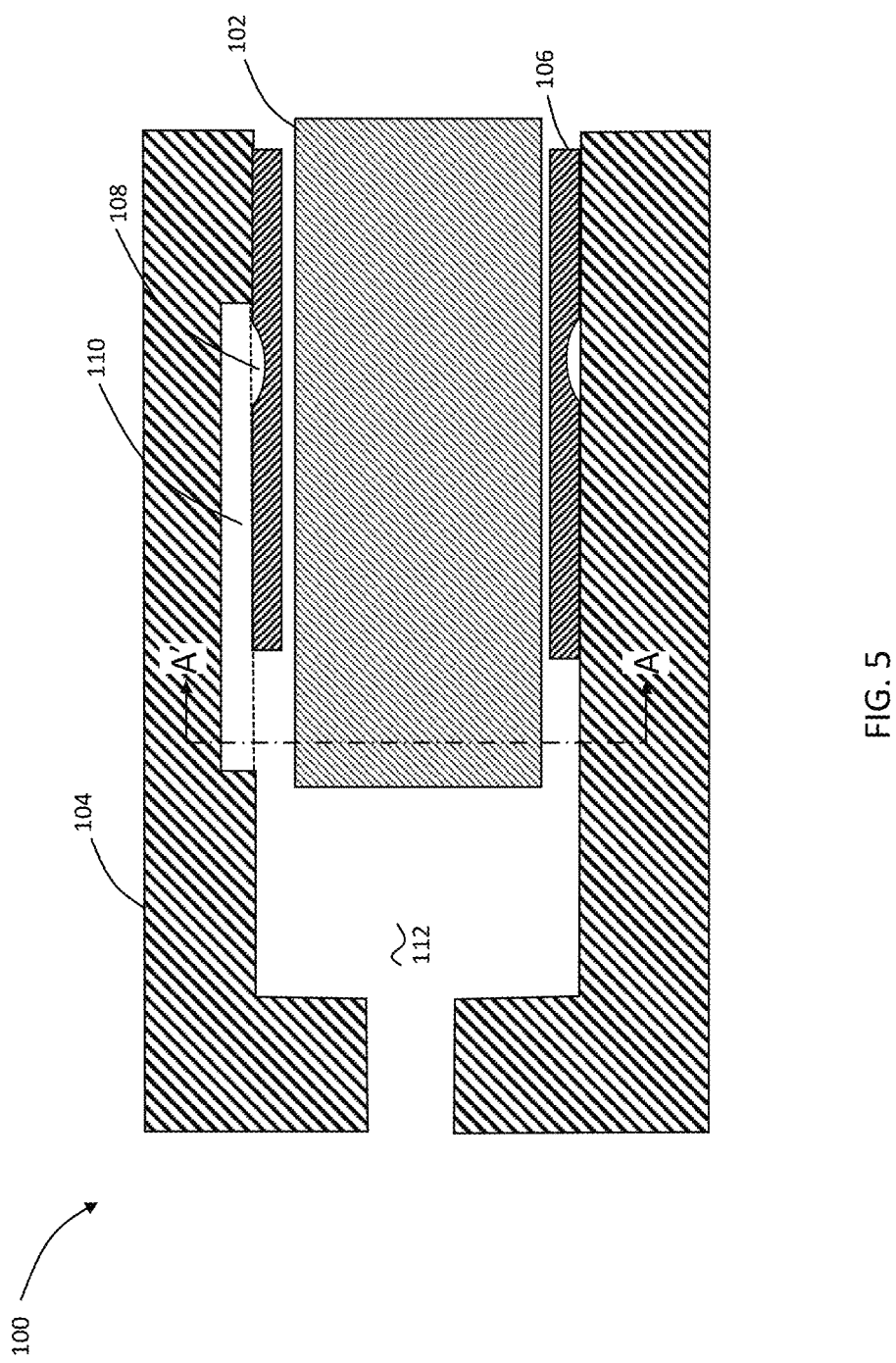
FIG. 5 is a cross sectional diagram of a piston-bushing-cylinder interface according to the present disclosure.

Owing to the superior compatibility of steel and brass as a material in a tribological interface, the piston-cylinder lubricating interface commonly uses brass bushing inserts in a steel cylinder block and a steel piston, however other material combinations are also of interest for the interface of present disclosure. This facilitates wear-in of the cylinder bushing during initial runs as well as prevents metal seizure. The novel design according to the present disclosure includes a circumferential groove on an outer surface of a bushing as shown in FIG. 5, which is a cross-sectional view of the piston-bushing-cylinder interface 100. The interface 100 includes a piston 102, slidably disposed in a cylinder 104. A cylindrical bushing 106 is provided about the piston 102. The bushing 106 includes a circumferential groove 108 formed thereon (i.e., on the outside surface). The bushing 106 is press-fit into the cylinder 104. A channel 110 allows fluid communication between a high-pressure side 112 and the groove 108. When pressure builds up in the high-pressure side 112, the bushing 106 deflects about the groove 108, thereby providing improved sealing when needed while providing a wearable surface, at the same time minimize frictional losses when the pressure in the high-pressure side 112 is low (i.e., when the pressure in the high-pressure side 112 is low, the deformation adaptively reduces, which results in a higher clearance, to avoid additional frictional losses, resulting in less stringent tolerances). In other words, the bushing 106 provides the benefit of lower energy losses due to frictional forces during most of the reciprocating motion of the piston, while providing superior sealing surface when pressure in the high-pressure side 112 reaches a specific value, at which point the bushing 106 begins to deflect about the groove 108. It is during this phase of the cycle that fluid has a tendency to escape from the high-pressure, and why in typical axial piston machines (e.g., the one shown in FIG. 2) the piston-cylinder interface is always a tight interface resulting in excessive frictional losses during the entire cycle. Therefore, the pressure inside the groove 108 varies in correspondence with the pressure in the respective displacement chamber pressure (i.e., the high-pressure side 112). Thus, the pressure in the circumferential groove 108 would contribute to the pressure deformations in the bushing 106. The location of the channel 110 along the outer circumference of the bushing 106 and inside the block body is selected in a way that the structural strength of the block is not compromised, which is design-specific. Referring to FIG. 6, a section A-A' (see FIG. 5, which is a cross sectional diagram of a piston-bushing-cylinder interface according to the present disclosure) is cut away to further show the piston-bushing-cylinder interface 100. Further clarification is provided in FIGS. 7a and 7b which are a cross-sectional view of the bushing as well as a perspective view of the same, respectively.

Such solid body deformations in the bushing due to the pressurized groove would cause the lubricating fluid film to shrink in accordance with the variation in the displacement chamber pressure (i.e. high-pressure side 112). The bushing and the cylinder block are considered as one body made of different materials insofar as simulation is concerned in presence of the pressure and deformations pursuant thereto.

A simulation study was performed considering such a modified bushing and cylinder block for a commercial 75 cc pump design under a range of different operating conditions. The cylinder block and the pistons were considered to be made of steel while the bushings were considered as brass. The material properties for the different mechanical parts implemented in the simulation study are shown in Table 1.

TABLE 1

Material properties of solid parts used in simulation

| Material Property | Pistons | Cylinder Block | Bushings |
|---|---|---|---|
| Elastic Modulus [GPa] | 210 | 210 | 110 |
| Poisson's ratio [–] | 0.27 | 0.27 | 0.31 |
| Thermal co-efficient of linear expansion [E-6/° C.] | 12 | 12 | 19 |
| Thermal conductivity [W/m ° C.] | 54 | 54 | 63 |

Different combinations of the design parameters for the groove were studied using the influence matrix approach, known to a person having ordinary skill in the art, to design the circumferential groove 108. The groove, if located more towards the case end of the piston-bushing-cylinder interface 100 would be favorable as the pressure in the gap would be lower towards the case end as compared to the displacement chamber end. The width and depth of the groove were determined by an iterative process for a given location of the groove. The groove parameters assumed for the scope of this presented studies are summarized in Table 2, according to exemplary embodiment. All the parameters have non-dimensionalized with the bushing guide length ($l_f$).

TABLE 2

Circumferential pressurized groove: design parameters

| Parameter | Value |
|---|---|
| Location of the center of the groove from the case end (L) | $\dfrac{l_f}{3}$ |
| Width of the groove (w) | $0.211 l_f$ |
| Depth of the groove (d) | $0.015 l_f$ |

Table 3 reports three simulated operating conditions studied with the grooved bushing in the pumping mode of operation. As shown, a frequently occurring operating condition along with a high pressure operating condition and a partial displacement operating condition have been chosen to investigate the effect of the grooved bushing. The high pressure allows highlighting of the physical phenomena related to pressure deformations and material properties.

TABLE 3

Operating conditions

| Operating conditions | OC1 | OC2 | OC3 |
|---|---|---|---|
| High pressure [bar] | 475 | 325 | 325 |
| Low Pressure [bar] | 25 | 25 | 25 |
| Angular Speed [rpm] | 3600 | 2000 | 2000 |
| Displacement [%] | 100 | 100 | 20 |

Figure 8:
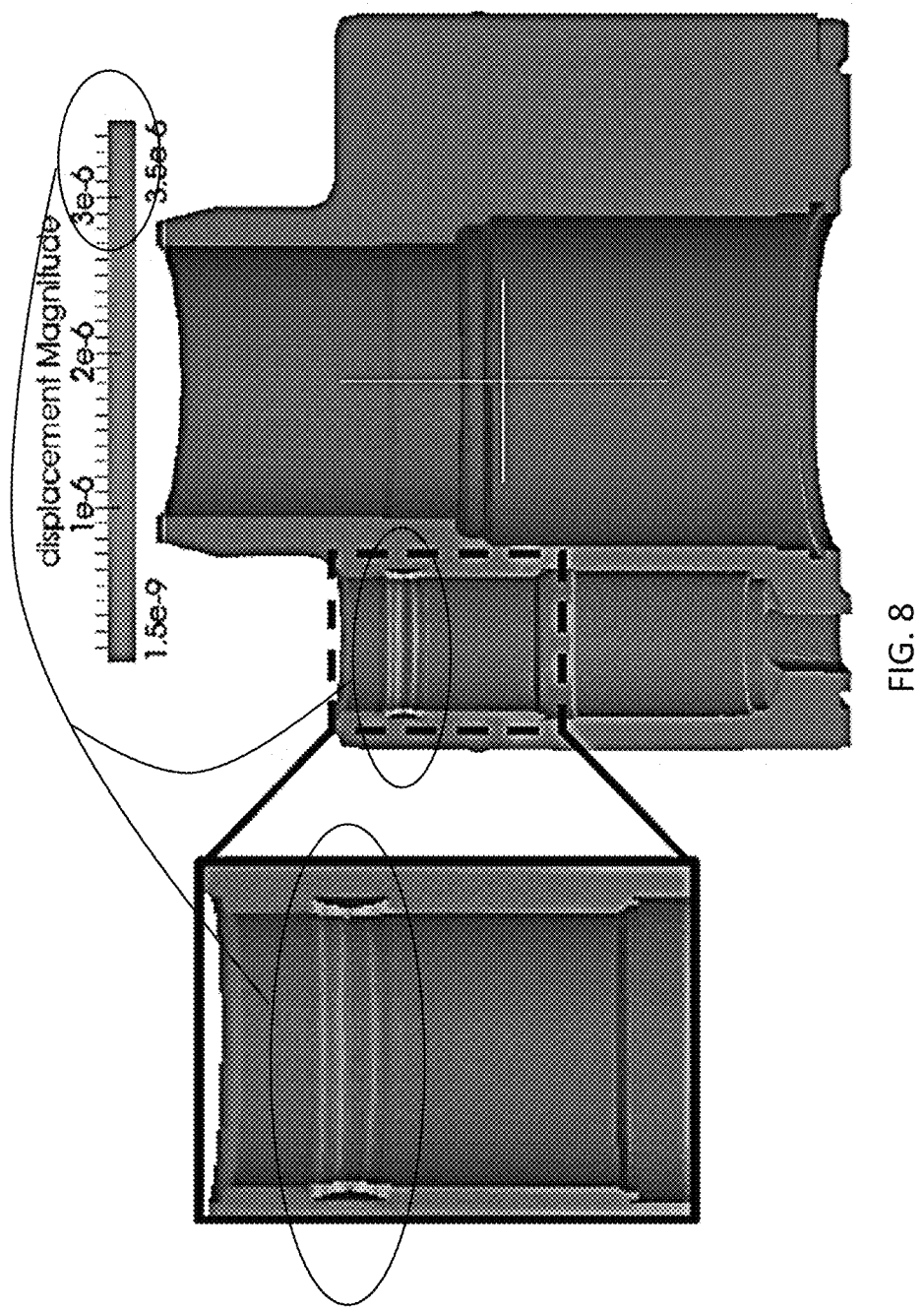
FIG. 8 is a deformation map providing results of deformation simulation of the cylinder block and the bushing with a 100 bar reference pressure in the displacement chamber and thus the groove, according to the present disclosure.

Referring to FIG. 8, which is a deformation map, results of deformation simulation of the cylinder block and the bushing with a 100 bar reference pressure in the displacement chamber and thus the groove is shown. Therefore, such a groove outside the bushing is shown to reduce the leakage flow during the high pressure stroke thus reducing the net energy dissipation from the piston/cylinder interface.

Figure 9:
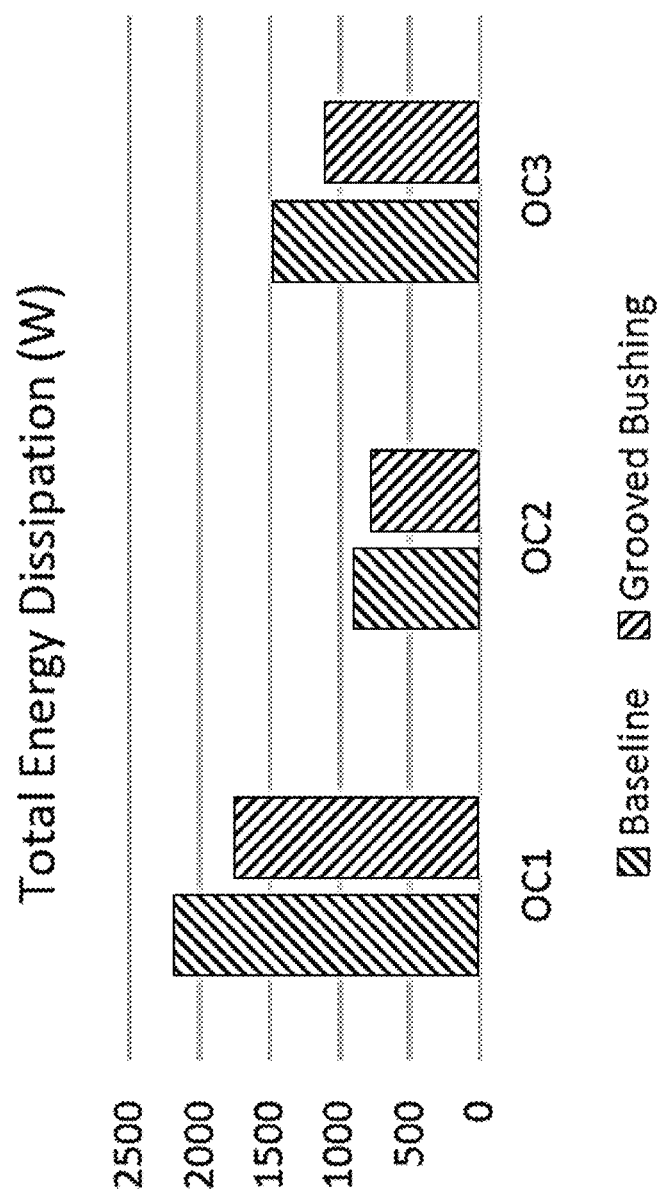
FIGS. 9 and 10 are bar graphs that provide results of a comparison of total energy dissipation and leakage between the piston-bushing-cylinder interface of the present disclosure vs. a baseline piston-cylinder interface.
Figure 10:
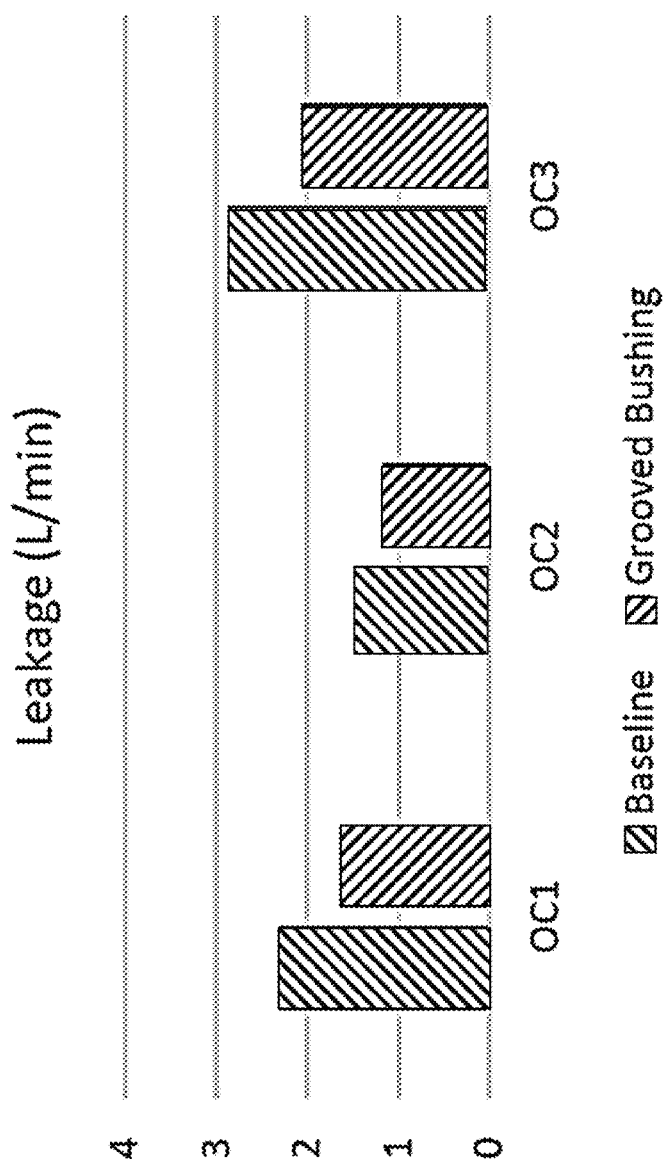

The novel piston-bushing-cylinder interface 100 described in the present disclosure was simulated and compared to a baseline stock unit in the total energy dissipation and leakage from the piston-cylinder interfaces. It should be noted that all the energy dissipation and leakage values reported are summed up over all the piston-cylinder interfaces. FIGS. 9 and 10 are bar graphs that provide results of this comparison (i.e., comparison of total energy dissipation and leakage between the piston-bushing-cylinder interface of the present disclosure vs. a baseline piston-cylinder interface).

Table 4 summarizes the energy dissipation values for the three operating conditions per revolution for the piston/cylinder interface.

TABLE 4

Performance comparison at nominal clearance

| | Energy Dissipation (W) | Leakage (L/min) | Torque Loss (Nm) |
|---|---|---|---|
| Baseline | | | |
| OC1 | 2182.8 | 2.30 | 2.48 |
| OC2 | 903.0 | 1.47 | 1.60 |
| OC3 | 1477.4 | 2.87 | 0.43 |
| Grooved Bushing | | | |
| OC1 | 1744.0 | 1.62 | 2.65 |
| OC2 | 770.2 | 1.16 | 1.70 |
| OC3 | 1082.2 | 2.06 | 0.50 |

It can be observed from Table 4 As seen from Table that the grooved bushing reduces the net energy dissipation from the piston/cylinder interface by reducing the leakage flow without compromising much on the torque loss. This reduction in the energy dissipation due to a decrease in the leakage is mainly during the high pressure stroke of the piston.

Figure 11:
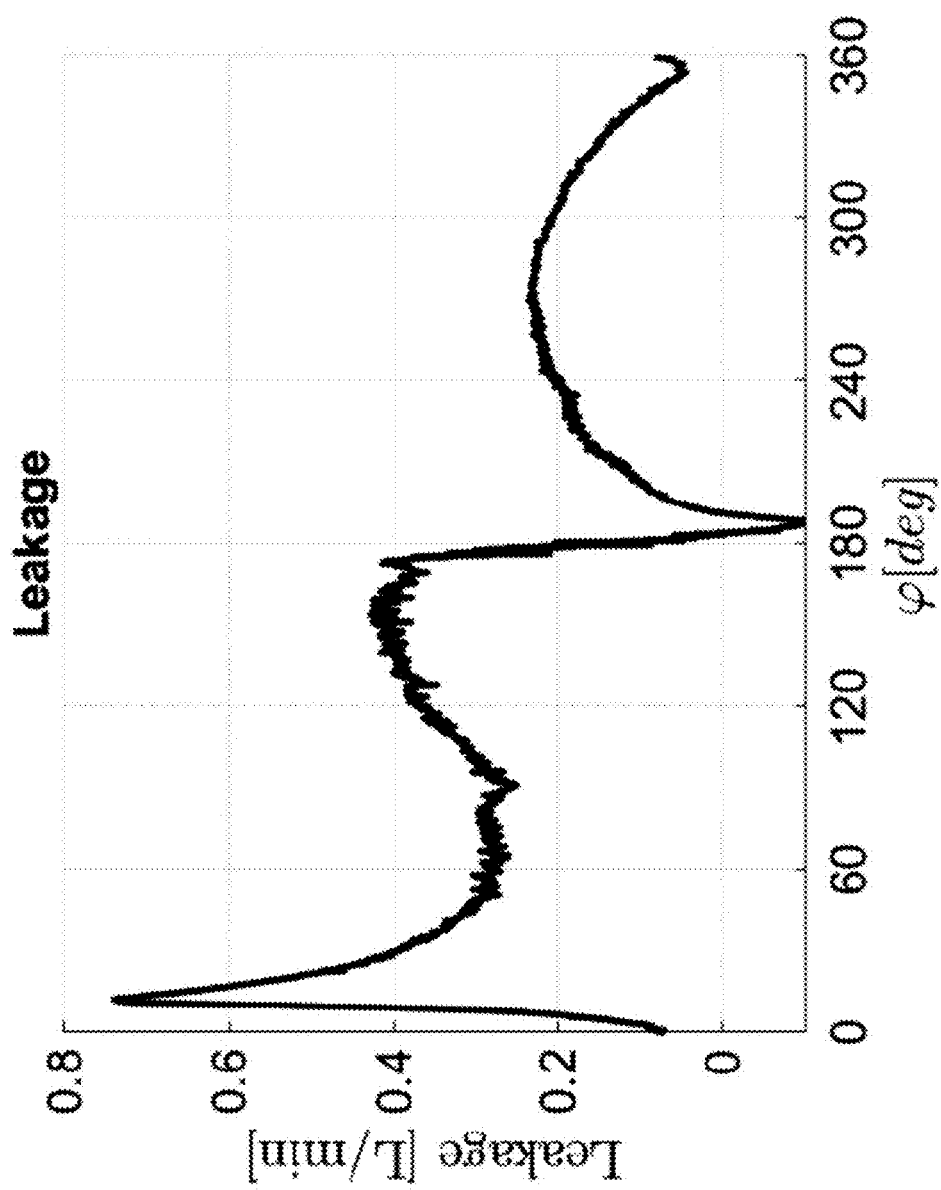
FIGS. 11 and 12 are graphs of the leakage flow (L/min) over one complete shaft revolution ($\varphi=0°-360°$) for both the baseline (FIG. 11) and the grooved bushing of the piston-bushing-cylinder interface of the present disclosure for an operating condition at nominal clearances.
Figure 12:
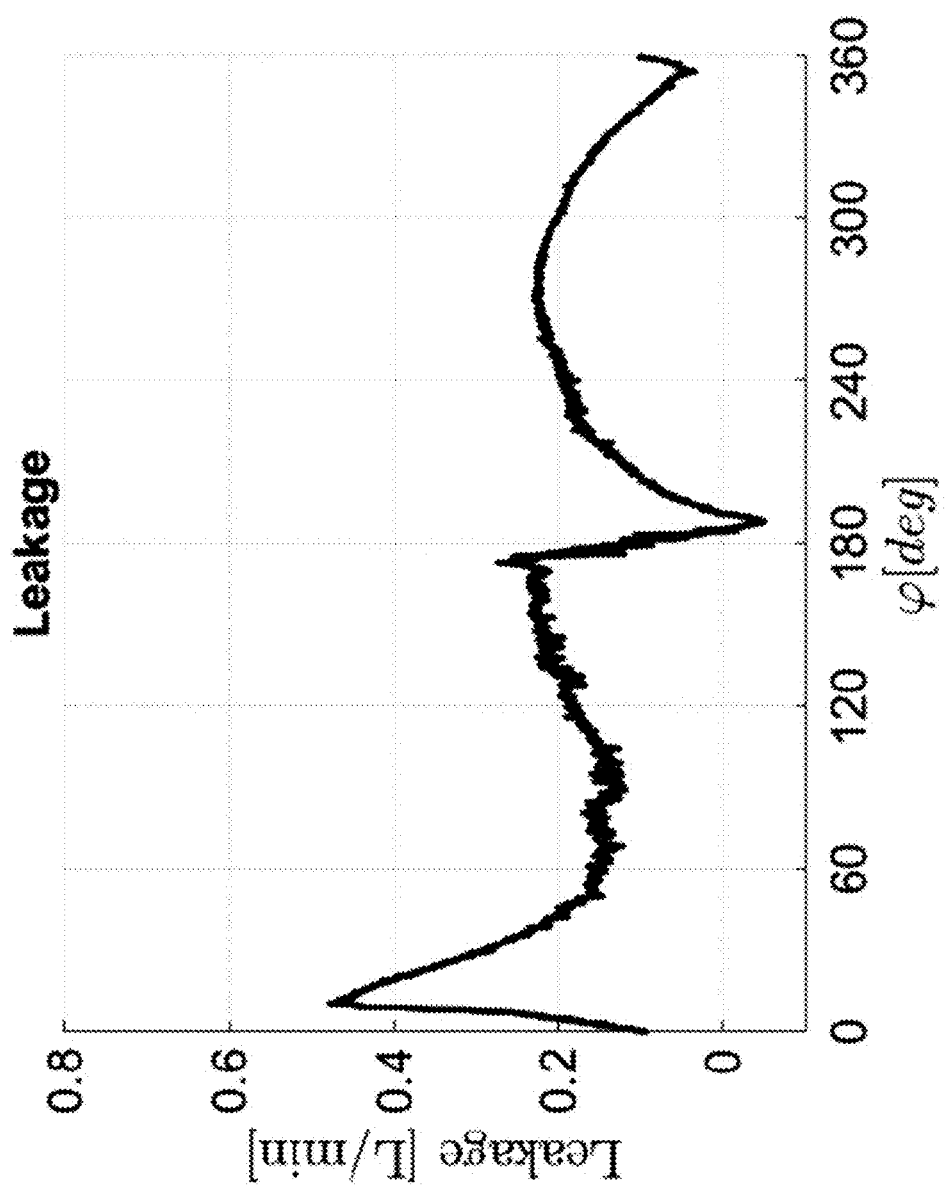

Referring to FIGS. 11 and 12, show graphs of the leakage flow (L/min) over one complete shaft revolution ($\varphi=0°–360°$) for both the baseline (FIG. 11) and the grooved bushing of the piston-bushing-cylinder interface of the present disclosure for an operating condition (OC1 discussed above) at nominal clearances.

Reviewing FIGS. 11 and 12, there can easily be seen a decrease in leakage. This reduction in leakage can be attributed to the fact that during the high pressure stroke the pressure in the groove is higher than the pressure in the gap and this causes the fluid film to be reduced locally due to the induced deformation of the bushing. This constricts the leakage flow path dominant in the typical piston-cylinder interface.

Figure 13:
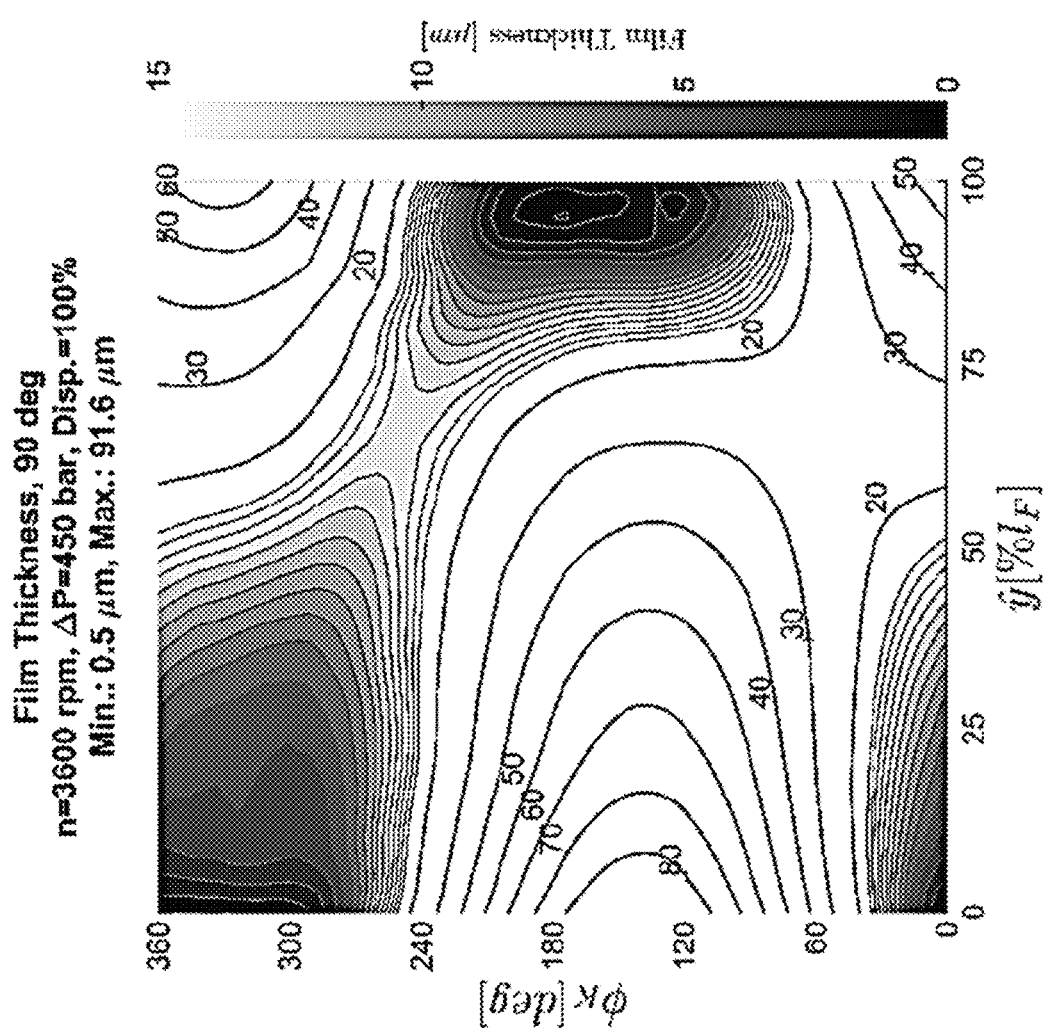
FIGS. 13 and 14 are the unwrapped fluid film thickness contours for the baseline (FIG. 13) and the grooved bushing of the present disclosure at 90-degree shaft angle (FIG. 14).
Figure 14:
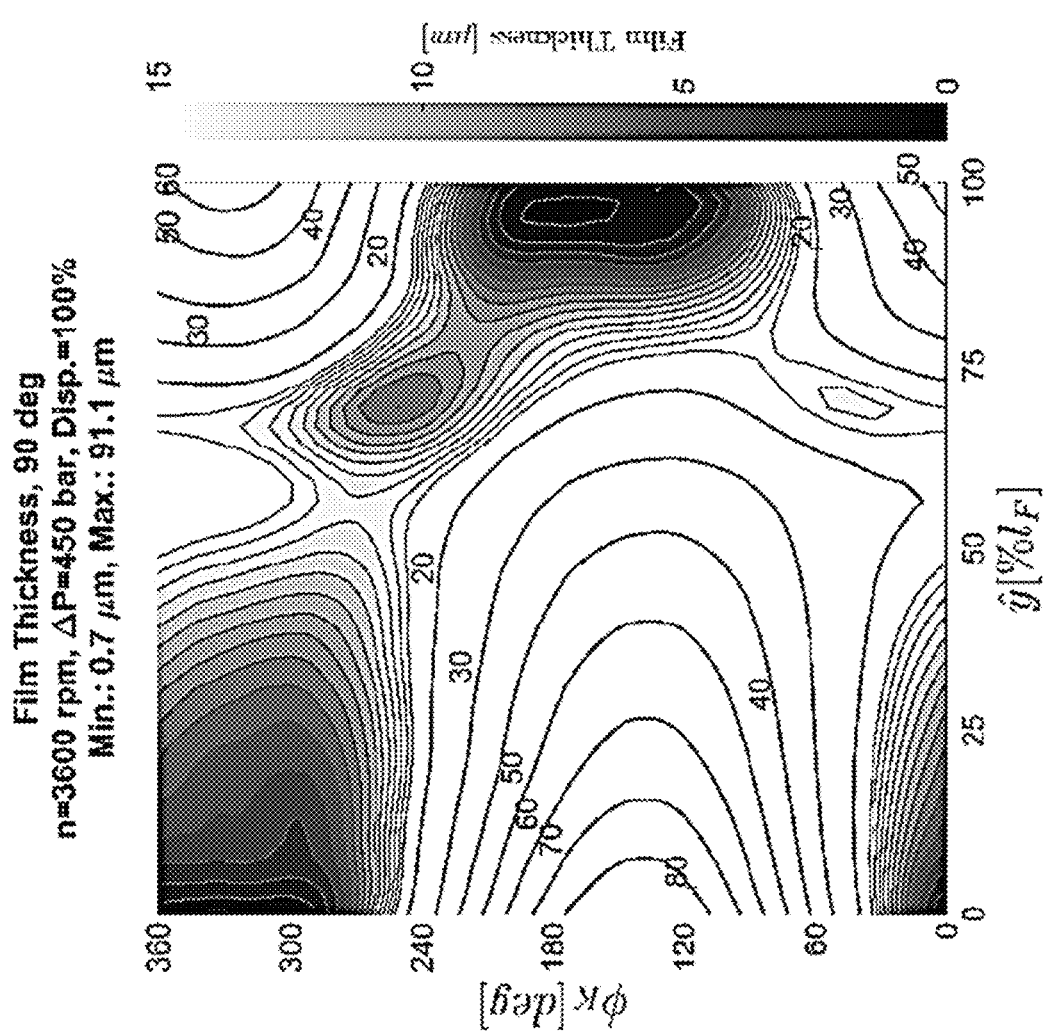
Figure 16:
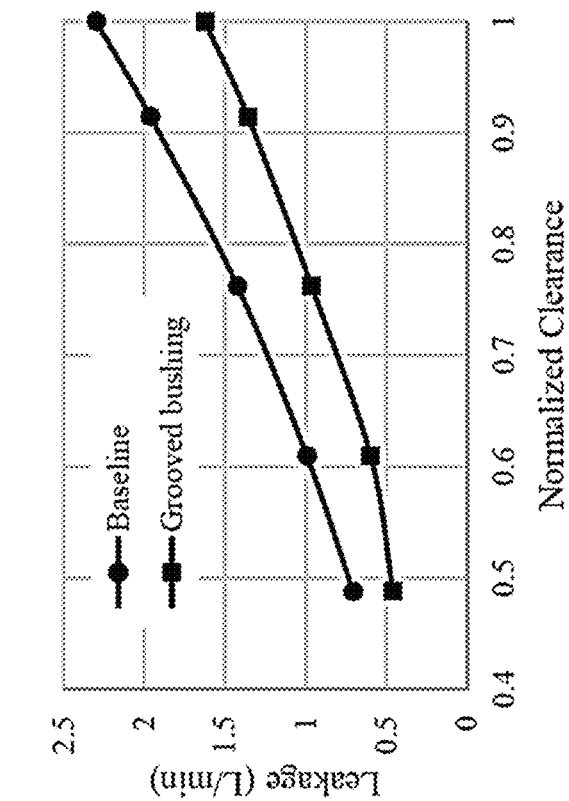
FIGS. 15, 16, 17, 18, 19, and 20, graphs of energy dissipation and leakage vs. normalized clearances for different clearance study cases/

Referring to FIGS. 13 and 14, shows the unwrapped fluid film thickness contours for the baseline (FIG. 13) and the grooved bushing of the present disclosure at 90-degree shaft angle (FIG. 14). The film thickness contours are plotted with the axial direction location normalized with the bushing guide length ($l_f$).

Since, the leakage is a direct function of the fluid film thickness which in turn is governed by the radial clearance between the solid bodies, another alternative to reduce the leakage is by reducing the radial clearance between the solid bodies. During designing of the interface, this value of radial clearance between the solid bodies is governed by the manufacturing tolerances. Therefore, a clearance study was carried out to analyze the combined effect of the groove and reduced relative radial clearance. Apart from directly comparing the performance of the grooved bushing to the baseline at reduced clearance, it would be interesting to see how much reduction in clearance in the baseline design will result in the equivalent energy dissipation as that of the grooved bushing at the nominal clearance of the standard unit.

Referring to FIGS. 15, 16, 17, 18, 19, and 20, graphs of energy dissipation and leakage vs. normalized clearances are shown. These figures show the variation of energy dissipation and leakage with decreasing clearance. The radial clearance has been normalized with the nominal clearance of the standard unit.

Figure 15:
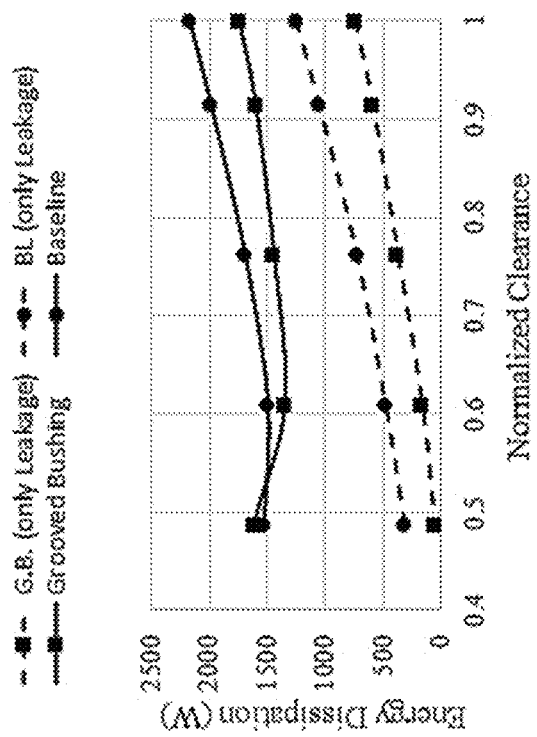
Figure 18:
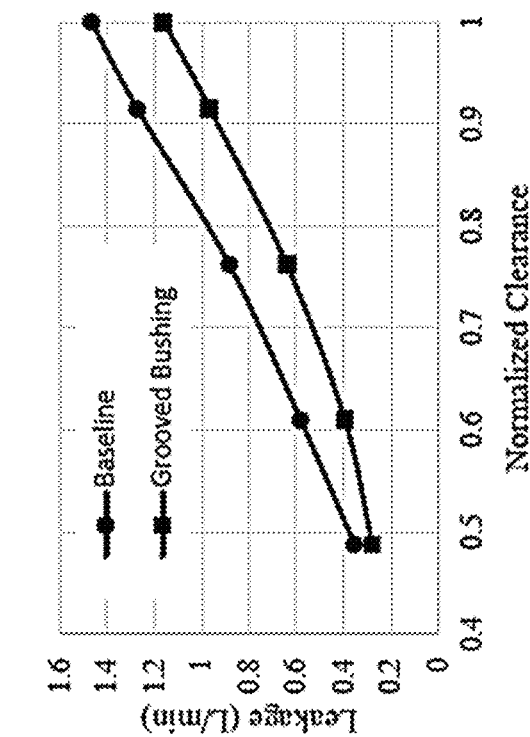
Figure 17:
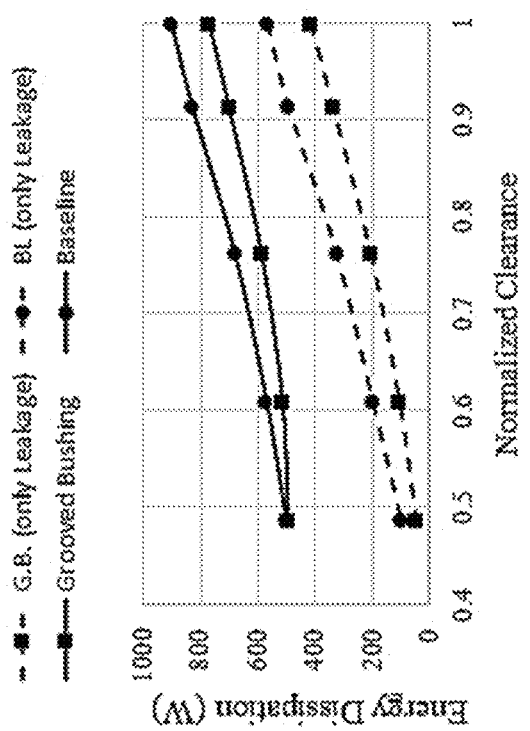
Figure 20:
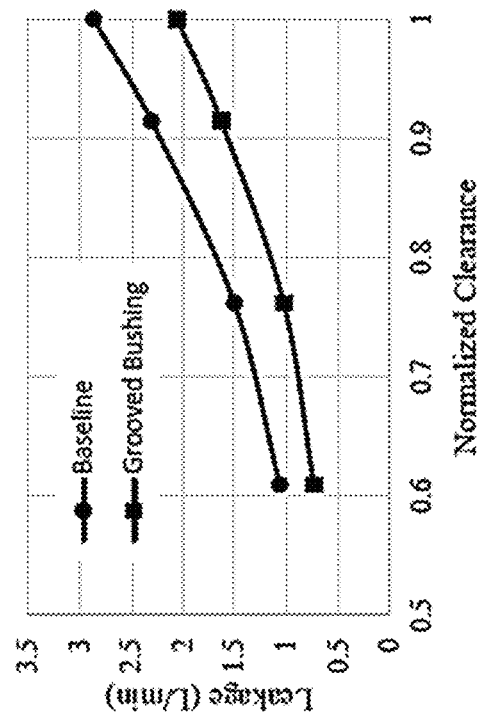
Figure 19:
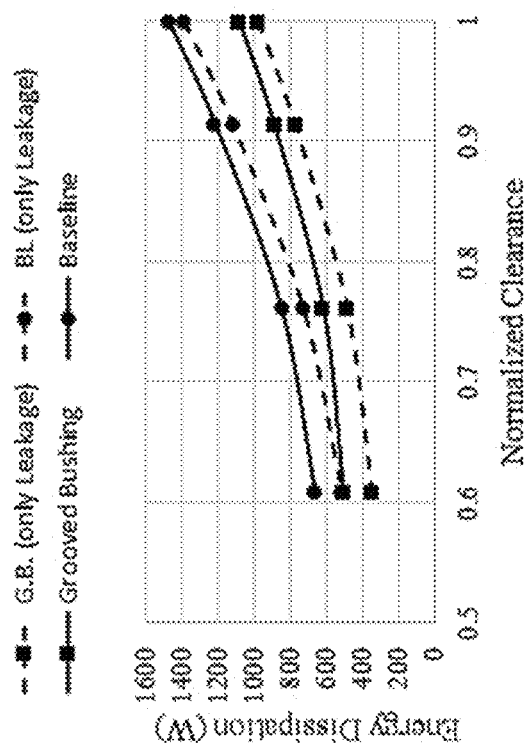

As seen from the above results, the energy dissipation is consistently lower than the baseline unit even at lower clearances with the same groove which was investigated at nominal clearance. However, the net decrease in energy dissipation from the baseline due to the reduction in leakage using a grooved bushing decreases with a decrease in clearance. This phenomenon at lower clearances for a given operating condition can be attributed to the pressure in the gap being relatively higher than that at nominal clearances. Higher pressure in the lubricating fluid film will reduce the effect of such a circumferential groove whose performance is dictated by the pressure differential between the displacement chamber pressure and the pressure in the gap. At very low clearances, the deformations generated in the gap might decrease the leakage flow but increase the torque loss and therefore the net energy dissipation as seen in FIG. 15. Therefore, there might be a necessity to re-design the groove if the interface is manufactured at very low clearances.

However, as seen from the above figures, the total energy dissipation using the grooved bushing according to the present disclosure at nominal clearance is equivalent to a baseline interface performance at approximately 15% reduced clearance for all the operating conditions. This proves to be a major advantage of the novel piston-bushing-cylinder interface of the present disclosure as the manufacturing tolerances required to achieve a desired performance from the interface would be relatively lower. This relaxation of manufacturing tolerances results in a significant cost-savings. Moreover, all the design changes are at macro-level and thus do not require specialized machining required with micro-level solutions offered in the prior art.

The piston can be selected from a variety of materials. For example, the piston material can be selected from the group consisting of steel, aluminum, mixtures thereof, or alloys thereof. Similarly, the cylinder material can be selected from a variety of materials. For example, the cylinder material can be selected from the group consisting of steel, aluminum, mixtures thereof, or alloys thereof. The bushing material can also be selected from a variety of materials. For example, the bushing material can be elected from the group consisting of brass, bronze, aluminum, mixtures thereof, or alloys thereof.

Figure 7B:
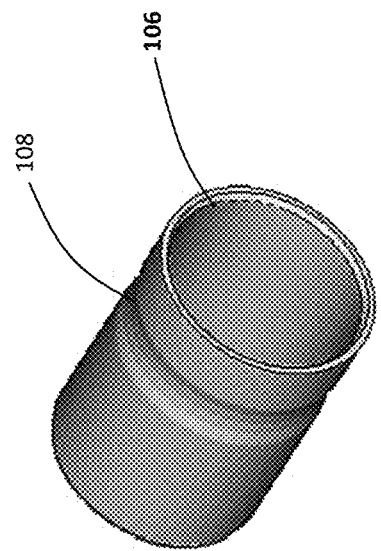
FIGS. 7a and 7b are a cross-sectional view of the bushing according and a perspective view of the same, respectively, according to the present disclosure.
Figure 7A:
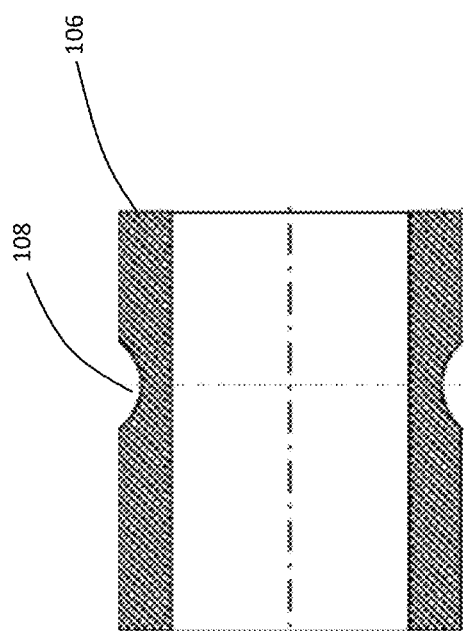

It should be noted that while a single groove 108 is shown in the bushing 106 of FIGS. 5, 7a, and 7b, no such limitation is intended. Referring to FIG. 21 which is a cross section of a bushing according to one embodiment, there are two grooves shown in the bushing. Accordingly, there may be one groove, two grooves, or more, depending on the length of the bushing while maintaining the structural integrity of the bushing.

Similarly, while in FIGS. 5, 7a, and 7b, the grooves shown to be disposed around the bushing's entire circumference, no such limitation is intended. Referring to FIGS. 22 and 23 which are end views of bushings according to various embodiments, one bushing is shown with a groove covering the entire circumference (FIG. 22), similar to FIG. 7b, and one bushing is shown where the groove covers only 50% of the circumference (FIG. 23). An angle θ is shown as a gauge of how far the grooves extends. Thus it is within the scope of the present disclosure for the angle θ to be between about 10° and 360°.

Figure 24:
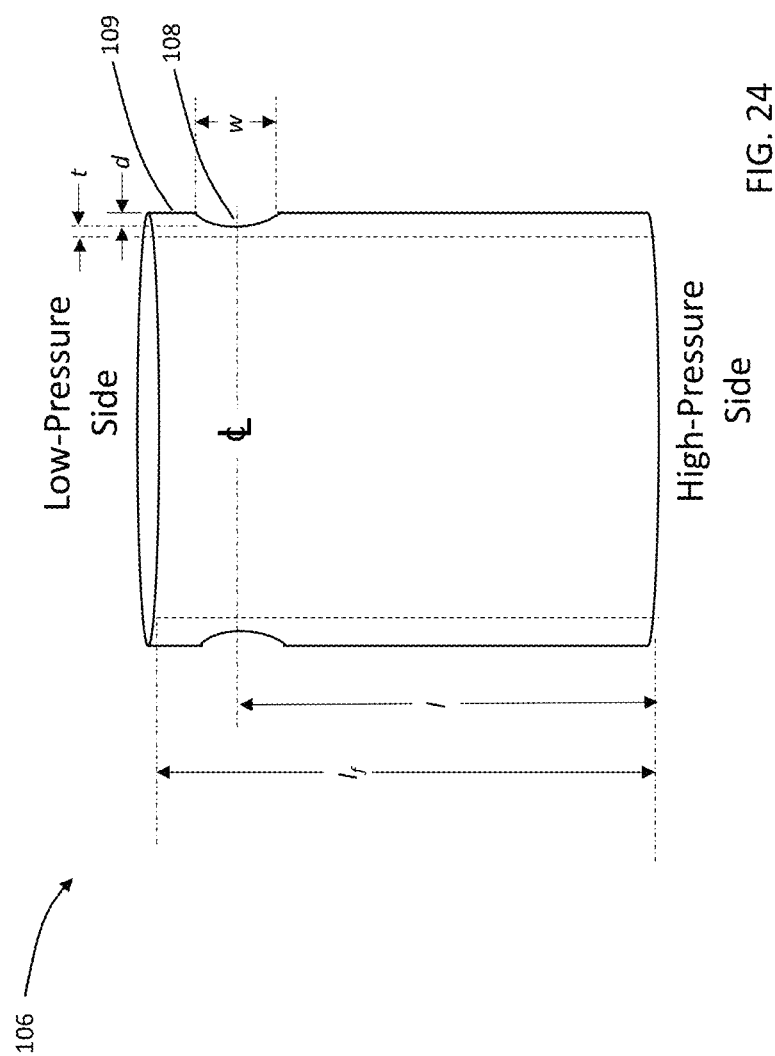
FIG. 24 is a perspective view of the bushing, according to one embodiment of the present disclosure.

The bushing 106 is more clearly shown in FIG. 24, which is a perspective view of the bushing, according to one embodiment of the present disclosure. The bushing 106 is described by its length $l_f$, and the groove 108 by its width w, depth d, and thickness t of the sidewall at the deepest point of the groove 108. The groove 108 is to be located above the centerline of the bushing (i.e., $l_f/2$) of the bushing's height and the end (denoted as low-pressure side), such that there remains sufficient material between the end of the groove 108 and the end of the bushing 106 (identified in FIG. 24 as 109) for operational integrity. The length of the bushing to the centerline of the groove from the bottom side (denoted high-pressure side) is l. A critical ratio is defined based on these parameters as:

$$CR = \frac{w^2 P_{max}}{tcE} \frac{l}{l_f} = const. \quad (15)$$

where, E is the young's modulus in N/mm$^2$,
$P_{max}$ is the maximum pressure that the groove 108 has to sustain in MPa,
w, t are the dimensions of the groove 108 as described above and shown in FIG. 24 in m,
l is the location of the groove from high-pressure side of the bushing in m, $l_f$ is the length of the lubrication gap between the piston and cylinder and
c is the total diametrical clearance between the piston and the cylinder. This CR is designed to provide sufficient deflection to achieve the aforementioned goals of the present disclosure while maintaining the structural integrity of the bushing. Accordingly, in one embodiment of FIG. 24, the CR is between about 1 and 0. In particular, CR towards 0 means less deformation and CR=0 behaves similar to a conventional axial piston machine; CR towards 1 means useful range of deformations; and CR greater than 1 would result in excessive deformation that could result in metal to metal contact. Furthermore, If material is more stiff, the thickness (t) is decreased, or the depth of the groove (d) is increased; if the groove 108 is less deep, thickness (t) is higher so thus need to increase the width (w) for the same deformation. If the groove 108 is more deep, thickness (t) is decreased and thus the width (w) needs to be decreased for the same deformation.

Figure 25:
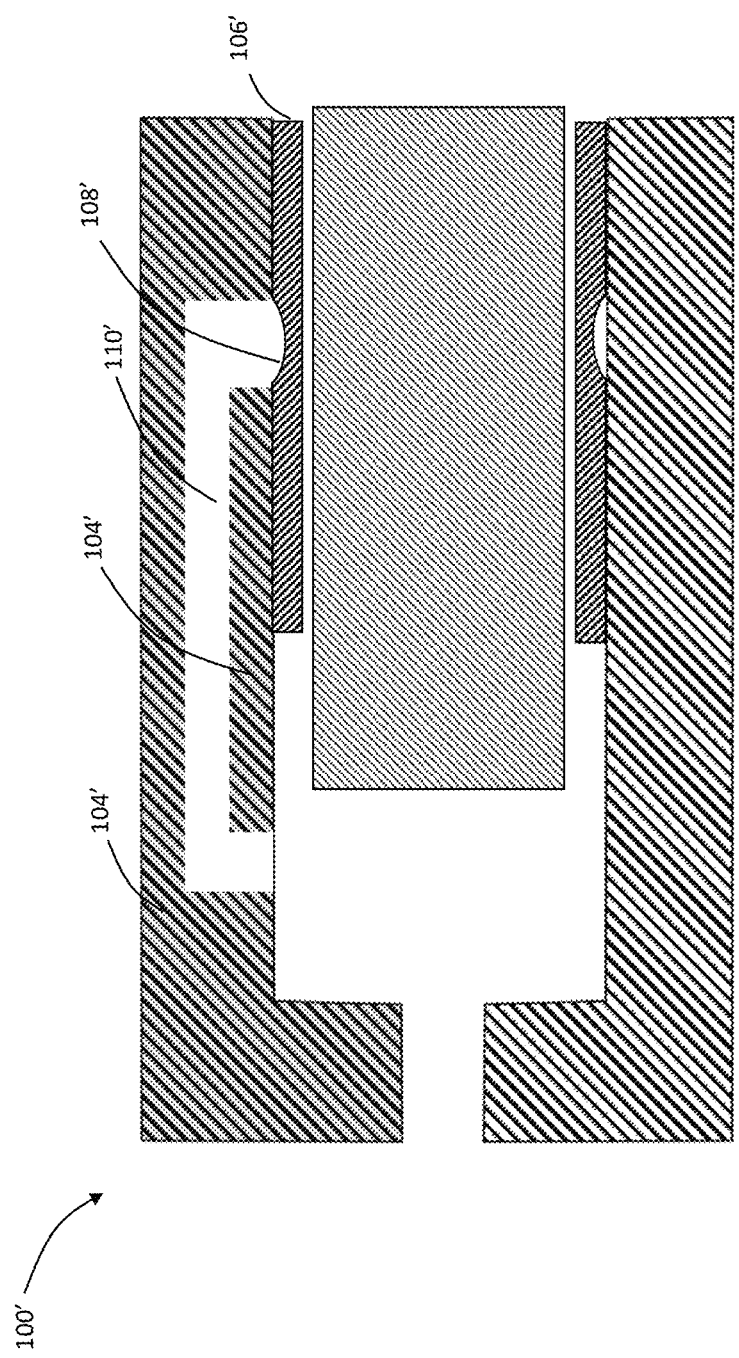
FIG. 25 is a piston-bushing-cylinder interface shown with the cylinder and bushing therein with a groove formed thereon.
Figure 26:
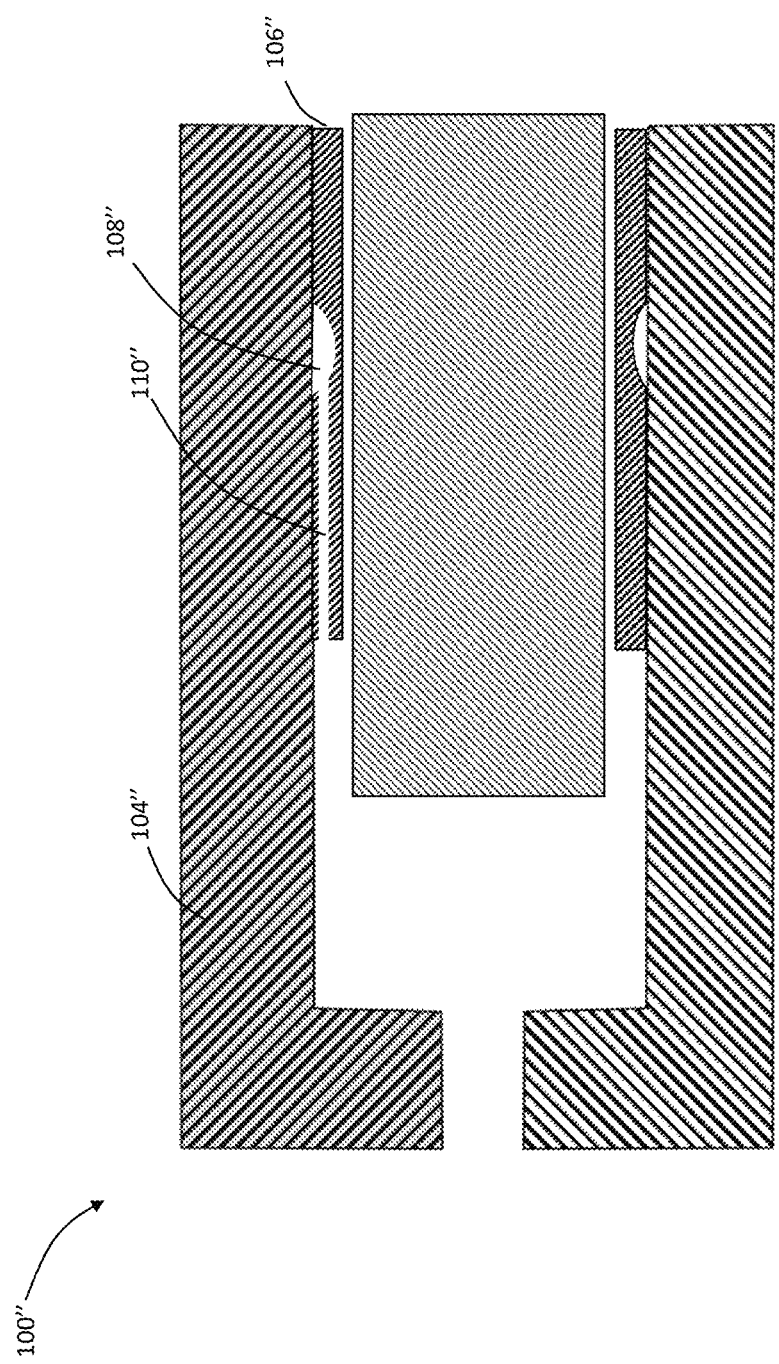
FIG. 26 is a piston-bushing-cylinder interface shown with the cylinder and bushing therein with a groove formed thereon.

Additionally, while in FIGS. 5 and 6, the groove 108 is in fluid communication by wave of channel 110, no such limitation is intended by the present disclosure. It should be appreciated that other configurations are possible. For example, referring to FIGS. 25 and 26 which are cross sectional schematics of various embodiments of fluid communication with the groove, two such embodiments are shown. Referring to FIG. 25, a piston-bushing-cylinder interface 100' is shown with the cylinder 104' and bushing 106' therein with a groove 108' formed thereon. The cylinder 104' includes a channel 110' that is in communication with the groove 108' such that except for the width of the groove, the cylinder 104' makes complete contact with the bushing 106'. In FIG. 26, a piston-bushing-cylinder interface 100" is shown with the cylinder 104" and bushing 106" therein with a groove 108" formed thereon. The bushing 106" includes a channel 110" formed therein that is in communication with the groove 108" such that no machining of the cylinder 104" is necessary. This channel 110" requires sufficient thickness in the material of the bushing so as to maintain structural integrity of the bushing in operation.

Figure 27:
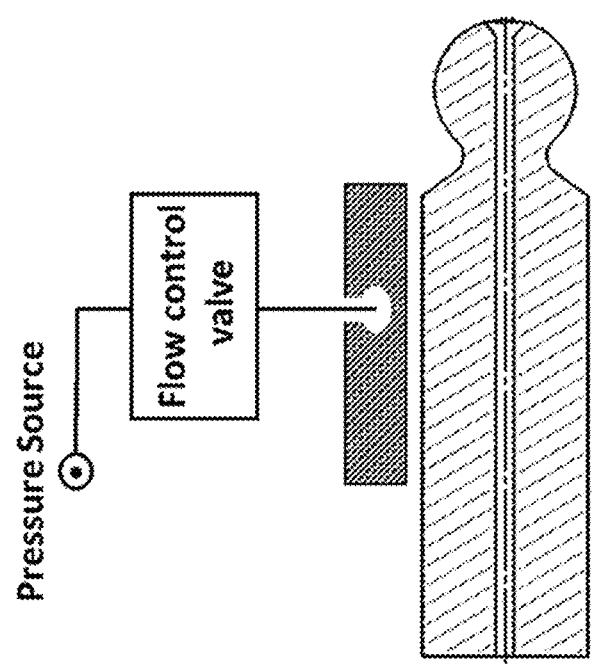
FIG. 27 is a simplified schematic of yet another piston-bushing-cylinder, where the groove is in fluid communication with a pressurized source having a valve arrangement allowing for pressurized timing and control of the groove.

While in the embodiment shown in the above-referenced figures the fluid communication is the high-pressure side of the piton-bushing cylinder (e.g., 100' in FIG. 25), no such limitation is intended in the present disclosure. In one embodiment, shown in FIG. 27 which is a simplified schematic of yet another piston-bushing-cylinder, where the groove is in fluid communication with pressurized source having a valve arrangement allowing for pressurized timing and control of the groove. This configuration allows a more robust timing control for pressure which is independent of the piston-cylinder interface shown in the aforementioned figures, however at a cost of complexity.

In addition to the bushing materials discussed here, in other embodiments, the bushing may be constructed with one material and coated with another material for improved performance in various situations where reduced frictional forces are of interest, or for improved cyclic loading of the bushing.

Figure 28:
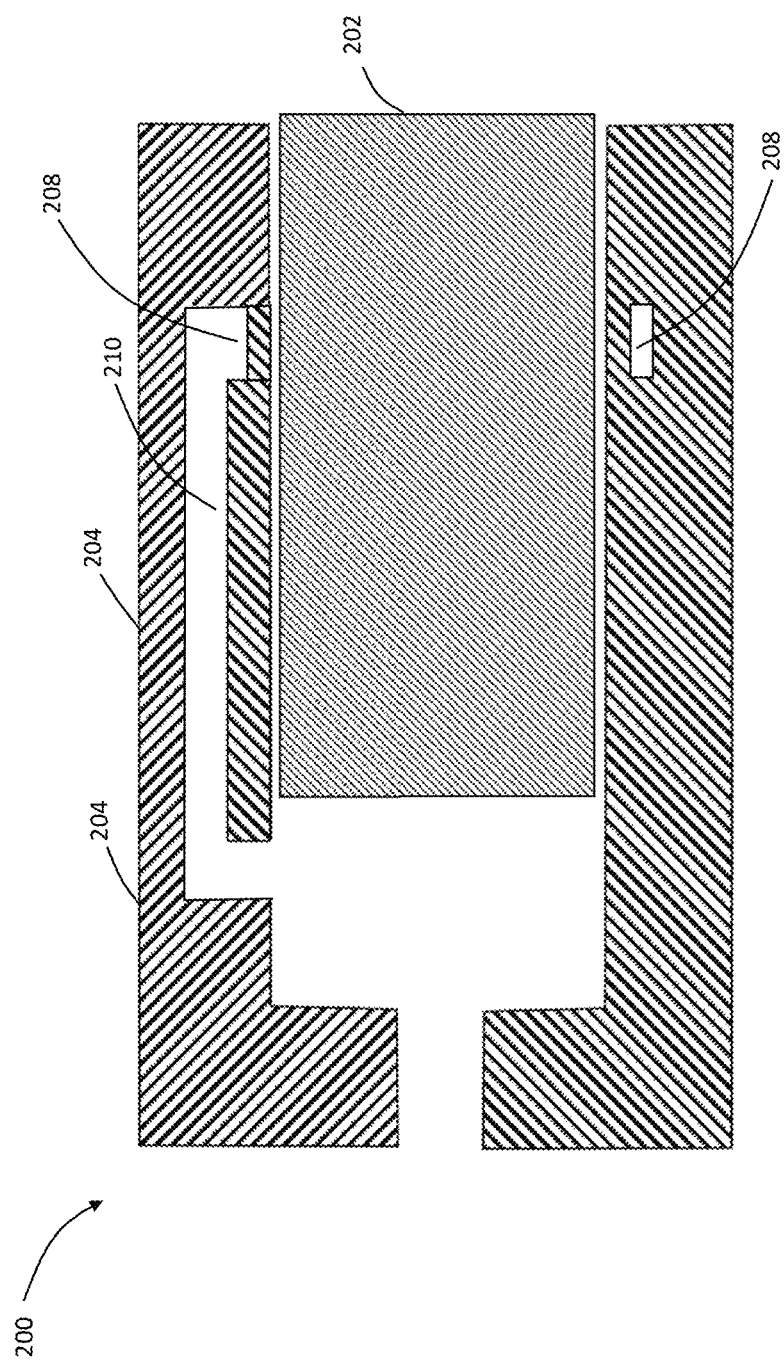
FIG. 28 is a piston-cylinder interface shown with the cylinder and a reciprocating piston disposed therein, where the cylinder has at least one circumferential cavity formed therein and a fluid channel form therein in fluid communication with the at least one circumferential cavity.

Up to this point the thrust of the present disclosure is tied to a piston-bushing-cylinder interface, where the clearance is adaptive based on pressures applied to the groove disposed on the bushing, particularly when high pressure is applied thereto. In yet another embodiment, a completely new design is presented. With reference to FIG. 28, a cross-sectional view of a novel piston-cylinder interface is presented where instead of a bushing with a groove formed thereon in communication with high-pressure, a cavity is formed in the cylinder wall which is also in fluid communication with the high-pressure side or an external pressure source. The mathematical relationship, material selection, and pressure communication channels described above with respect to the bushing apply to this design. The piston-cylinder interface 200 is shown with a piston 202 and a cylinder 204 having a cavity 20 in fluid communication with the high-pressure side of the cylinder 204 via a channel 210. As discussed with respect to the piston-bushing-cylinder interface, high pressure during the high-pressure stroke of the piston 202, is communicated to the cavity 208 via the channel 210 causing the cylinder 204 to deflect about the cavity 208 resulting an improved sealing, while not sacrificing a tight tolerance during the remainder of the stroke.

Those having ordinary skill in the art will recognize that numerous modifications can be made to the specific implementations described above. The implementations should not be limited to the particular limitations described. Other implementations may be possible.

The invention claimed is:

1. A piston and cylinder assembly of a piston-type positive displacement machine, comprising:
   a cylinder having a uniform internal diameter;
   a cylindrical bushing press-fit against the inner surface of the cylinder and extending at least partially therein, the bushing comprising at least one circumferential groove formed on an outer surface of the bushing against the inner surface of the cylinder;
   a piston reciprocably disposed within the cylindrical bushing, generating a piston-bushing-cylinder interface, the piston and the bushing defining a diametrical clearance therebetween, the diametrical clearance defining a lubrication gap and a fluid-dynamic seal between the piston and the cylindrical bushing, creating fluid-dynamic buildup of pressure therebetween, the reciprocating action of the piston defines a cyclic motion including 1) a negative pressure phase wherein the piston is retracted from base of the cylinder thereby drawing in fluid from outside of the cylinder into the cylinder, and 2) a high-pressure phase in which the piston is pushed towards the base of the cylinder with fluid therein, a fluid channel between the at least one circumferential groove of the cylindrical bushing and a high pressure source.

2. The piston and cylinder assembly of an axial piston machine of claim 1, wherein the high-pressure source is an external source to the piston-bushing-cylinder interface.

3. The piston and cylinder assembly of an axial piston machine of claim 2, wherein the high-pressure source is adapted to selectively apply pressure to the at least one circumferential groove of the cylindrical bushing thereby selectively deflecting the cylindrical bushing.

4. The piston and cylinder assembly of an axial piston machine of claim 1, wherein the high-pressure source is from the high-pressure phase in which the piston is pushed towards the base of the cylinder with fluid therein.

5. The piston and cylinder assembly of an axial piston machine of claim 1, wherein the at least one circumferential groove of the cylindrical bushing is at least two.

6. The piston and cylinder assembly of an axial piston machine of claim 1, wherein the at least one circumferential groove of the cylindrical bushing is positioned along a length of the bushing between a top end and a midpoint of the bushing, where the top end is in a low-pressure region of the piston-bushing-cylinder interface.

7. The piston and cylinder assembly of an axial piston machine of claim 6, wherein the at least one circumferential groove of the cylindrical bushing is defined by a width w, a depth d, and a thickness of the bushing, wherein a critical ratio of $$CR = \frac{w^2 P_{max}}{tcE} \frac{l}{l_f}$$

is between 0 and 1, where

E is the young's modulus in N/mm$^2$, $P_{max}$ is the maximum pressure that the at least one circumferential groove is adapted to sustain in MPa, w, t are dimensions of the at least one circumferential groove in m, l is location of the at least one circumferential groove from high-pressure side of the cylindrical bushing in m, $l_f$ is the length of the lubrication gap between the piston and the cylinder, and c is the total diametrical clearance between the piston and the cylinder.

8. The piston and cylinder assembly of an axial piston machine of claim 1, wherein the at least one circumferential groove of the cylindrical bushing is extended circumferentially along the cylindrical bushing based on an angular disposition θ ranging from about 10° to 360°.

9. The piston and cylinder assembly of an axial piston machine of claim 1, wherein the fluid channel between the at least one circumferential groove of the cylindrical bushing and the high pressure source is formed in the cylinder.

10. The piston and cylinder assembly of an axial piston machine of claim 1, wherein the fluid channel between the at least one circumferential groove of the cylindrical bushing and the high pressure source is formed in the cylindrical bushing.

11. A piston and cylinder assembly of a piston-type positive displacement machine, comprising:

a cylinder having a uniform internal diameter, the cylinder comprising at least one circumferential cavity formed therein;

a piston reciprocably disposed within the cylinder, generating a piston-cylinder interface, the piston and the cylinder defining a diametrical clearance therebetween, the diametrical clearance defining a lubrication gap and a fluid-dynamic seal between the piston and the cylinder, creating fluid-dynamic buildup of pressure therebetween, the reciprocating action of the piston defines a cyclic motion including 1) a negative pressure phase wherein the piston is retracted from base of the cylinder thereby drawing in fluid from outside of the cylinder into the cylinder, and 2) a high-pressure phase in which the piston is pushed towards the base of the cylinder with fluid therein, a fluid channel between the at least one circumferential cavity of the cylinder and a high pressure source, wherein during the high pressure phase there is a substantial hydrostatic pressure differential between the piston-cylinder interface and the fluid channel.

12. The piston and cylinder assembly of an axial piston machine of claim 11, wherein the high-pressure source is an external source to the piston-cylinder interface.

13. The piston and cylinder assembly of an axial piston machine of claim 12, wherein the high-pressure source is adapted to selectively apply pressure to the at least one circumferential cavity of the cylinder thereby selectively deflecting the cylinder about the at least one circumferential cavity.

14. The piston and cylinder assembly of an axial piston machine of claim 11, wherein the high-pressure source is from the high-pressure phase in which the piston is pushed towards the base of the cylinder with fluid therein.

15. The piston and cylinder assembly of an axial piston machine of claim 11, wherein the at least one circumferential cavity of the cylinder is at least two.

16. The piston and cylinder assembly of an axial piston machine of claim 11, wherein the at least one circumferential cavity of the cylinder is positioned along a length of the cylinder between a top end and a midpoint of the cylinder, where the top end is in a low-pressure region of the piston-cylinder interface.

17. The piston and cylinder assembly of an axial piston machine of claim 16, wherein the at least one circumferential cavity of the cylindrical bushing is defined by a width w, a depth d, and a thickness, wherein a critical ratio defined by $$CR = \frac{w^2 P_{max}}{tcE} \frac{l}{l_f}$$

is between 0 and 1, where

E is the young's modulus in N/mm$^2$, $P_{max}$ is the maximum pressure that the at least one circumferential groove is adapted to sustain in MPa, w, t are width and thickness of the at least one circumferential cavity in m, l is location of the at least one circumferential cavity from high-pressure side of the cylinder in m, $l_f$ is the length of the lubrication gap between the piston and the cylinder, and c is the total diametrical clearance between the piston and the cylinder.

18. The piston and cylinder assembly of an axial piston machine of claim 11, wherein the at least one circumferential cavity of the cylinder is extended circumferentially along the cylinder based on an angular disposition θ ranging from about 10° to 360°.

19. The piston and cylinder assembly of an axial piston machine of claim 11, wherein the fluid channel between the at least one circumferential cavity of the cylinder and the high pressure source is formed in the cylinder.

* * * * *